United States Patent
Asoma

(10) Patent No.: US 8,194,153 B2
(45) Date of Patent: Jun. 5, 2012

(54) IMAGING APPARATUS, IMAGING METHOD AND PROGRAM

(75) Inventor: Akira Asoma, Kanagawa (JP)

(73) Assignee: Sony Corporation (JP)

( * ) Notice: Subject to any disclaimer, the term of this patent is extended or adjusted under 35 U.S.C. 154(b) by 315 days.

(21) Appl. No.: 12/587,508

(22) Filed: Oct. 8, 2009

(65) Prior Publication Data

US 2010/0097493 A1    Apr. 22, 2010

(30) Foreign Application Priority Data

Oct. 21, 2008   (JP) .............................. P2008-271152

(51) Int. Cl.
*H04N 5/235*    (2006.01)
*H04N 5/238*    (2006.01)
*H04N 5/262*    (2006.01)

(52) U.S. Cl. .................. 348/229.1; 348/364; 348/366; 348/239; 348/221.1

(58) Field of Classification Search ................. 348/362, 348/364, 366, 218.1, 239, 222.1, 221.1, 229.1, 348/216.1, 208.99
See application file for complete search history.

(56) References Cited

U.S. PATENT DOCUMENTS

| | | | |
|---|---|---|---|
| 5,455,621 A | 10/1995 | Morimura | |
| 6,670,993 B1 * | 12/2003 | Yamamoto et al. | 348/364 |
| 7,098,946 B1 * | 8/2006 | Koseki et al. | 348/239 |
| 7,460,168 B2 * | 12/2008 | Horiuchi | 348/362 |
| 8,023,004 B2 * | 9/2011 | Asoma | 348/229.1 |
| 2003/0001962 A1 | 1/2003 | Sakurai | |
| 2003/0095192 A1 * | 5/2003 | Horiuchi | 348/362 |
| 2004/0105027 A1 | 6/2004 | Kawamura et al. | |
| 2008/0231728 A1 * | 9/2008 | Asoma | 348/229.1 |
| 2010/0066858 A1 * | 3/2010 | Asoma | 348/229.1 |

FOREIGN PATENT DOCUMENTS

| | | |
|---|---|---|
| EP | 1971137 A2 | 9/2008 |
| EP | 1973341 A1 | 9/2008 |
| JP | 01060156 A | 3/1989 |
| JP | 06-141229 A | 5/1994 |
| JP | 2002-084449  * | 3/2002 |
| JP | 2002-084449 A | 3/2002 |
| JP | 2003018457 A | 1/2003 |
| JP | 2004072371 A | 3/2004 |
| JP | 2006254470 A | 9/2006 |
| JP | 2008136113 A | 6/2008 |
| JP | 2008228058 A | 9/2008 |

OTHER PUBLICATIONS

Eureopean Search Report, EP 09173521, dated Jul. 19, 2010.
Office Action from Japanese Application No. 2008-271152, dated Aug. 10, 2010.

* cited by examiner

*Primary Examiner* — Nhan T Tran
(74) *Attorney, Agent, or Firm* — Lerner, David, Littenberg, Krumholz & Mentlik, LLP

(57) ABSTRACT

In an imaging apparatus capable of selectively performing an imaging operation in normal imaging mode and that in composite imaging mode, auto exposure control is stopped after the auto exposure control for long-time exposure image signals and short-time exposure image signals is temporarily completed in composite imaging mode and if, after the auto exposure control is stopped, a predetermined brightness change in images is detected continuously for a predetermined time or longer based on brightness values detected from the images obtained from a composite image signal, the imaging mode of the imaging apparatus is switched from the composite imaging mode to the normal imaging mode.

7 Claims, 10 Drawing Sheets

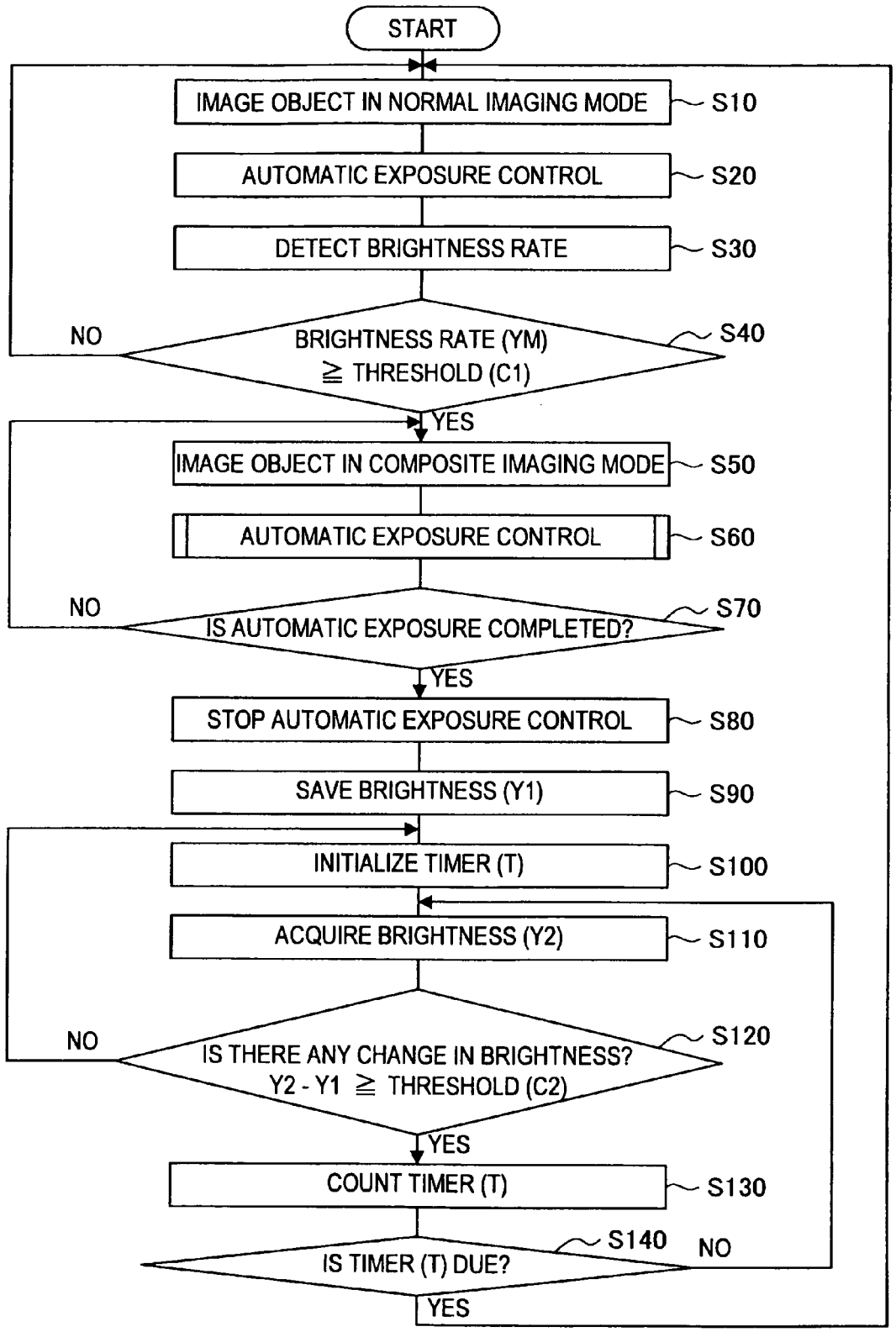

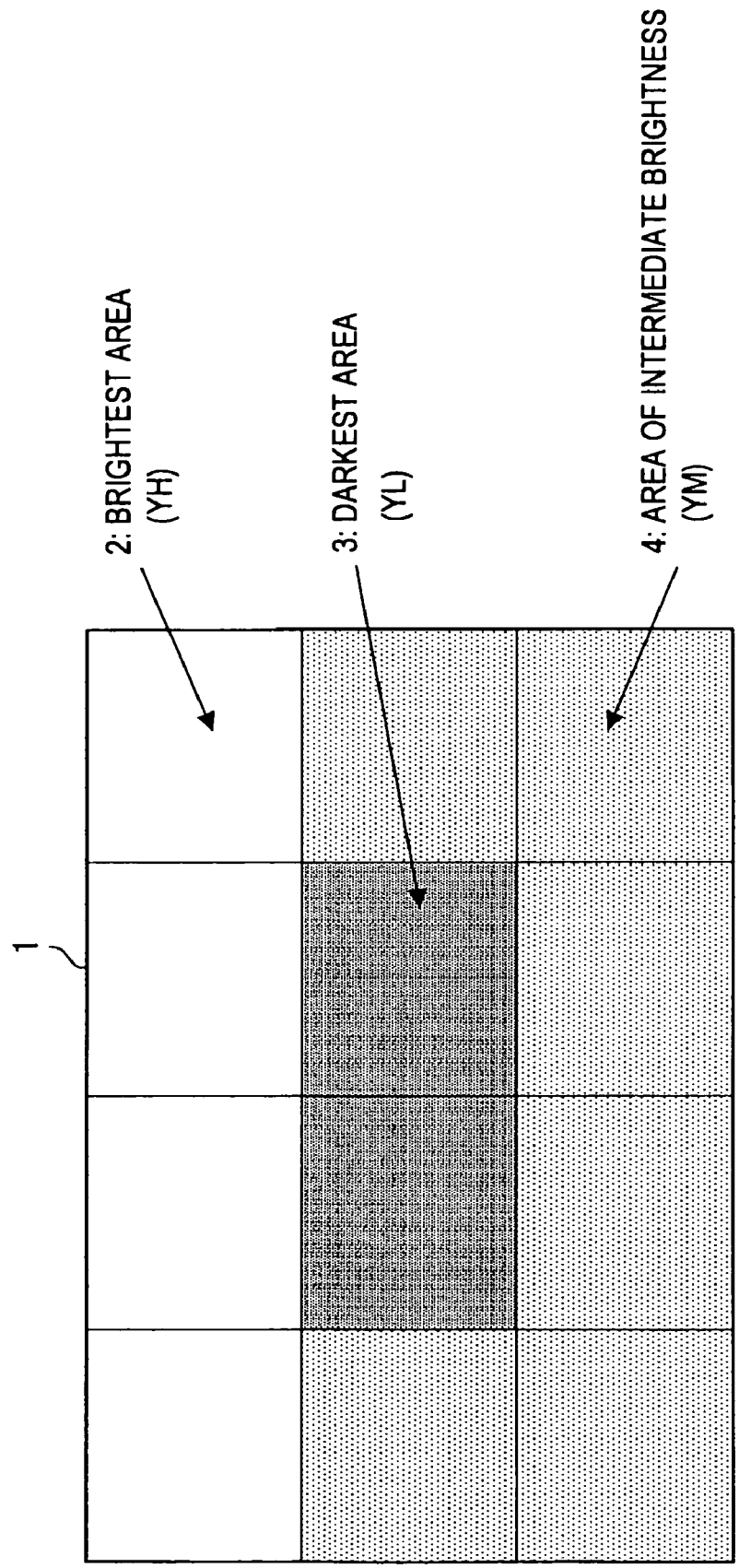

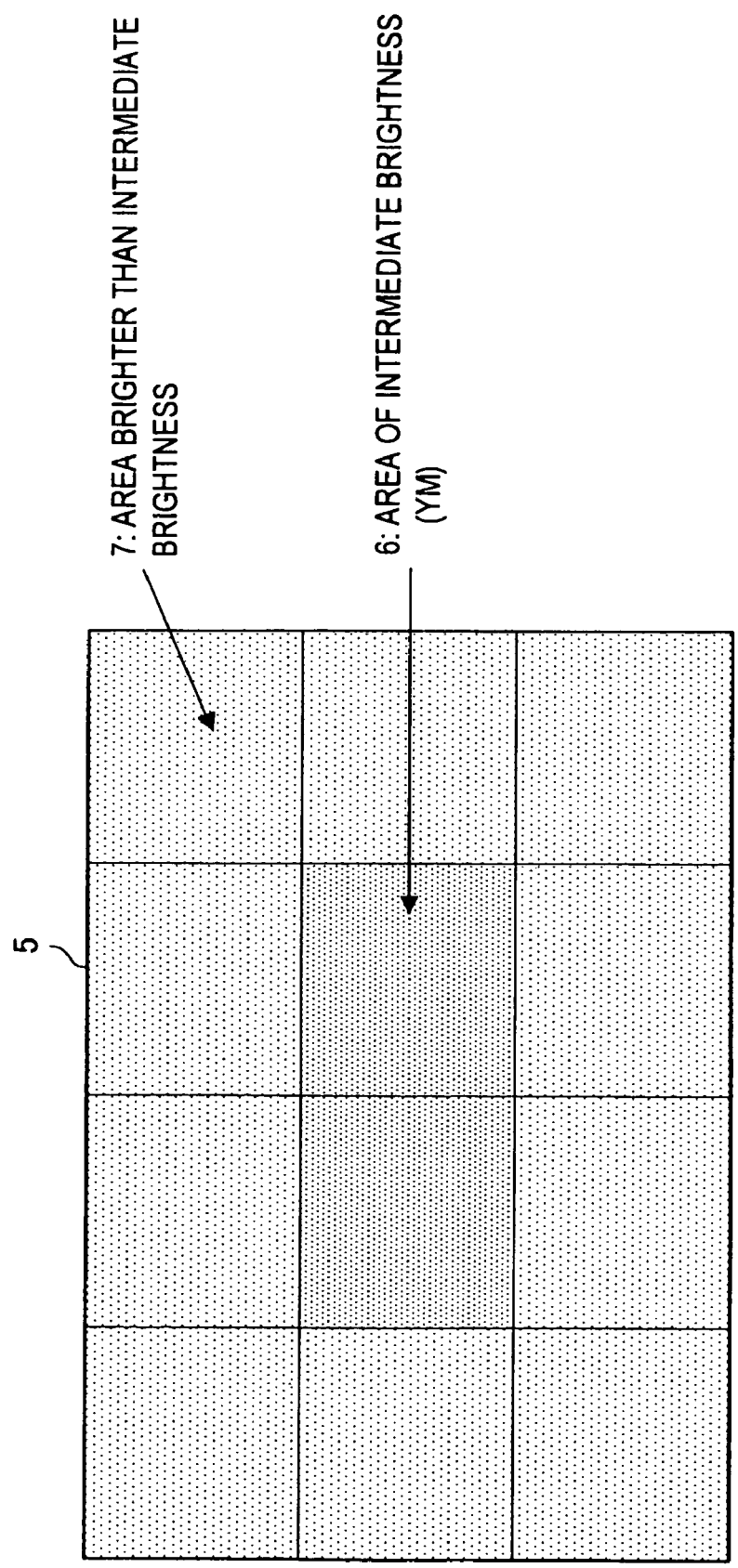

IMAGING APPARATUS, IMAGING METHOD AND PROGRAM

CROSS-REFERENCE TO RELATED APPLICATION

The present application claims priority from Japanese Patent Application No. JP 2008-271152 filed in the Japanese Patent Office on Oct. 21, 2008, the entire content of which is incorporated herein by reference.

BACKGROUND OF THE INVENTION

1. Field of the Invention

The present invention relates to an imaging apparatus, an imaging method, and a program.

2. Description of the Related Art

In an imaging apparatus in related art using a solid image pickup device such as a CCD (Charge Coupled Device), the quantity of light (light exposure) input into the image pickup device is adjusted by an aperture or electronic shutter speed. That is, when a bright scene is imaged, adjustments are made to reduce the light exposure so that so-called "overexposure" should not occur by an output signal of the image pickup device being saturated. Conversely, in a dark scene, adjustments are made to increase the light exposure so that so-called "underexposure" should not occur.

However, when a scene of high contrast is imaged (for example, backlight imaging or indoor/outdoor simultaneous imaging), there arises an issue described below. Due to an insufficient dynamic range of the solid image pickup device to be used, a bright portion is saturated to cause "overexposure" and "underexposure" is caused in a dark portion in which light exposure is insufficient by adjustments of light exposure alone so that it is difficult to properly reproduce both of such portions.

In order to solve this issue, a method of using two different electronic shutter speeds within a field has been developed (see, for example, Japanese Patent Application Laid-Open No. 6-141229). According to this method, the electronic shutter speed is changed for each field to image information of a bright area and that of a dark area separately and each piece of the obtained information is combined into one image. As an application of the above method, an imaging apparatus (wide dynamic range camera) capable of picking up images in a wide dynamic range is known.

Two types of operating states of a wide dynamic range camera are generally known: a composite imaging mode in which wide dynamic range imaging is performed and a normal imaging mode in which wide dynamic range imaging is not performed. However, high contrast in images obtained from the composite imaging mode are frequently lost and it is known that if switched to the composite imaging mode in conditions (scene) of a small brightness difference, an unnatural image with reduced contrast of image is obtained. To improve such conditions, a method of automatically switching to the normal imaging mode in conditions of a small brightness difference and to the composite imaging mode in conditions of a great brightness difference has been developed (see, for example, Japanese Patent Application Laid-Open No. 2002-84449).

According to Japanese Patent Application Laid-Open No. 2002-84449, a brightness difference between a bright portion and a dark portion of a pickup image detected in normal imaging mode is used as a switching condition from the normal imaging mode to the composite imaging mode. Then, in order to reduce the brightness difference in composite imaging mode, an underexposure correction and an overexposure correction are made by auto exposure control of a long-time exposure image signal and a short-time exposure image signal to expand the dynamic range.

SUMMARY OF THE INVENTION

However, brightness fluctuates more wildly when compared with the normal imaging mode while auto exposure control concerning dynamic range expansion (underexposure and overexposure corrections) in the composite imaging mode is exercised. Thus, before the auto exposure control is completed, there is an issue that unnatural images are output when compared with the normal imaging mode. The reason therefor is as follows.

In auto exposure control in composite imaging mode, correction processing of an underexposure portion of a long-time exposure image signal by adjustments of light exposure and correction processing of an overexposure portion of a short-time exposure image signal by adjustments of light exposure are performed simultaneously or sequentially. Further, depending on the circumstances, the auto exposure control is exercised by considering the distribution of brightness (for example, a brightness histogram) of an imaged object. Therefore, when compared with the normal imaging mode, the time necessary for auto exposure control becomes longer in composite imaging mode and also brightness of a composite image fluctuates more wildly so that output video from the imaging apparatus may be perceived to be unnatural by the user.

Further, if auto exposure control is exercised repeatedly in accordance with change (scene change) of an object in composite imaging mode, as described in Japanese Patent Application Laid-Open No. 2002-84449, the aforementioned unnatural video will be output more frequently due to a temporary brightness change of the object, leading to quality degradation as dynamic images. That is, if auto exposure control is exercised uninterruptedly in composite imaging mode, an underexposure correction and an overexposure correction will be made frequently by sensitively reacting to a temporary brightness change (for example, a brightness change caused by a person passing through an imaging range) of an object. Moreover, it takes time for auto exposure control in composite imaging mode before convergence. Therefore, output images in composite imaging mode becomes brighter or darker frequently, leading to poor viewability and unnatural video for the user.

The present invention has been made in view of the above issues and it is desirable to provide a novel and improved imaging apparatus, an imaging method and a program capable of suppressing frequent unnatural brightness changes accompanying dynamic range expansion in composite imaging mode and outputting stable composite images.

According to an embodiment of the present invention, there is provided an imaging apparatus, including an imaging processing unit capable of selectively performing an imaging operation in normal imaging mode to generate one normal exposure image signal in one unit period, and an imaging operation in composite imaging mode to generate a composite image signal by generating in one unit period a long-time exposure image signal for a relatively long exposure time and a short-time exposure image signal for a relatively short exposure time and combining the long-time exposure image signal and the short-time exposure image signal, the composite image signal having a wider dynamic range than a dynamic range of at least any one of the long-time exposure image signal and the short-time exposure image signal, a brightness detection unit that detects brightness values of images obtained from the normal exposure image signal or the composite image signal, and a control unit that performs auto exposure control to control light exposure of the normal exposure image signal or light exposure of the long-time exposure image signal and the short-time exposure image signal based on the brightness value detected by the brightness detection unit and also switches the imaging mode of the imaging processing unit between the normal imaging mode and the composite imaging mode based on the brightness value detected by the brightness detection unit. The control unit stops the auto exposure control after the auto exposure control for the long-time exposure image signal and the short-time exposure image signal is temporarily completed in the composite imaging mode, and if a predetermined brightness change of the images obtained from the composite image signal is continuously detected for a predetermined time or longer based on the brightness value detected by the brightness detection unit after the auto exposure control being stopped, the control unit switches the imaging mode of the imaging processing unit from the composite imaging mode to the normal imaging mode.

The auto exposure control in the composite imaging mode may include long-time exposure control to control the light exposure of the long-time exposure image signal by controlling at least any one of a diaphragm, a gain, or a shutter speed of the imaging processing unit to adjust the brightness value of a dark portion of the image obtained from the composite image signal to a first target brightness value and short-time exposure control to control the light exposure of the short-time exposure image signal by controlling the shutter speed of the imaging processing unit to adjust the brightness value of a bright portion of the image obtained from the composite image signal to a second target brightness value.

The auto exposure control in the composite imaging mode may further include processing to correct at least any one of the first target brightness value and the second target brightness value in accordance with a brightness distribution of the image obtained from the composite image signal.

The control unit may switch the imaging mode of the imaging processing unit from the composite imaging mode to the normal imaging mode and also starts the auto exposure control for the normal exposure image signal in the normal imaging mode if the control unit continuously detects the predetermined brightness change for a predetermined time or longer after the auto exposure control being stopped.

The control unit may store the brightness value detected by the brightness detection unit after the auto exposure control being stopped as a reference brightness value in the composite imaging mode and, if a difference between the brightness value detected by the brightness detection unit after the storage and the reference brightness value is equal to or greater than a predetermined threshold continuously for a predetermined time or longer, the control unit switches the imaging mode of the imaging processing unit from the composite imaging mode to the normal imaging mode.

According to another embodiment of the present invention, there is provided an imaging method by an imaging apparatus capable of selectively performing an imaging operation in normal imaging mode to generate one normal exposure image signal in one unit period, and an imaging operation in composite imaging mode to generate a composite image signal by generating in one unit period a long-time exposure image signal for a relatively long exposure time and a short-time exposure image signal for a relatively short exposure time and combining the long-time exposure image signal and the short-time exposure image signal, the composite image signal having a wider dynamic range than a dynamic range of at least any one of the long-time exposure image signal and the short-time exposure image signal, the method including the steps of switching the imaging mode of the imaging apparatus from the normal imaging mode to the composite imaging mode in accordance with a brightness difference in an image obtained from the normal exposure image signal, performing auto exposure control to control light exposure of the long-time exposure image signal and the short-time exposure image signal in the composite imaging mode and after the auto exposure control being temporarily completed, stopping the auto exposure control; and detecting brightness values of images obtained from the composite image signal after the auto exposure control being stopped and if a predetermined brightness change in the images obtained from the composite image signal is continuously detected for a predetermined time or longer based on the detected brightness value, switching the imaging mode of the imaging apparatus from the composite imaging mode to the normal imaging mode.

According to another embodiment of the present invention, there is provided a program causing a computer as an imaging apparatus capable of selectively performing an imaging operation in normal imaging mode to generate one normal exposure image signal in one unit period, and an imaging operation in composite imaging mode to generate a composite image signal by generating in one unit period a long-time exposure image signal for a relatively long exposure time and a short-time exposure image signal for a relatively short exposure time and combining the long-time exposure image signal and the short-time exposure image signal, the composite image signal having a wider dynamic range than a dynamic range of at least any one of the long-time exposure image signal and the short-time exposure image signal to execute the steps of switching the imaging mode of the imaging apparatus from the normal imaging mode to the composite imaging mode in accordance with a brightness difference in an image obtained from the normal exposure image signal, performing auto exposure control to control light exposure of the long-time exposure image signal and the short-time exposure image signal in the composite imaging mode and after the auto exposure control being temporarily completed, stopping the auto exposure control, and detecting brightness values of images obtained from the composite image signal after the auto exposure control being stopped and if a predetermined brightness change in the images obtained from the composite image signal is continuously detected for a predetermined time or longer based on the detected brightness value, switching the imaging mode of the imaging apparatus from the composite imaging mode to the normal imaging mode.

According to the above configuration, in an imaging apparatus capable of selectively performing an imaging operation in normal imaging mode and that in composite imaging mode, auto exposure control is stopped after the auto exposure control for long-time exposure image signals and short-time exposure image signals is temporarily completed in composite imaging mode and if, after the auto exposure control is stopped, a predetermined brightness change in images is detected continuously for a predetermined time or longer based on brightness values detected from the images obtained from a composite image signal, the imaging mode of the imaging apparatus is switched from the composite imaging mode to the normal imaging mode.

According to the present invention, as described above, frequent unnatural brightness changes accompanying dynamic range expansion in composite imaging mode can be suppressed so that stable composite images can be output.

BRIEF DESCRIPTION OF THE DRAWINGS

FIG. 5 is a flow chart showing overall processing of imaging operation by the imaging apparatus according to the embodiment;

FIG. 6A is an explanatory view showing a pickup image of an object against the light in normal imaging mode according to the embodiment;

FIG. 6B is an explanatory view showing a composite image when the same image as that in FIG. 6A is picked up in composite imaging mode;

DETAILED DESCRIPTION OF THE EMBODIMENTS

Figure 1:
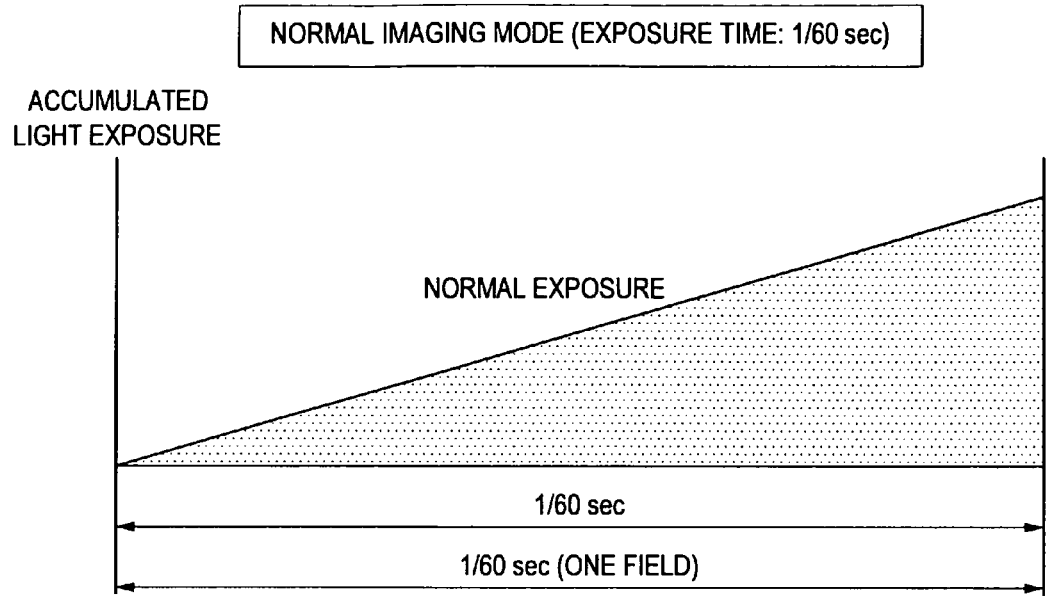
FIG. 1 is an explanatory view exemplifying exposure of a normal imaging mode according to an embodiment of the present invention.

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted.

The description will be provided in the order shown below:
1. Overview of imaging modes
2. Overview of imaging mode switching and auto exposure control
3. Configuration of the imaging apparatus
4. Processing flow of imaging operations An imaging apparatus and an imaging method according to an embodiment of the present embodiment will be described below. In the description that follows, a surveillance camera capable of picking up dynamic images is taken as an example of the imaging apparatus. However, the imaging apparatus according to the present invention is not limited to such an example and the present invention can be applied to any imaging device such as a digital still camera to pick up still images, digital video camera to pick up dynamic images, and mobile phone with a camera function.

[1. Overview of Imaging Modes]

Figure 2:
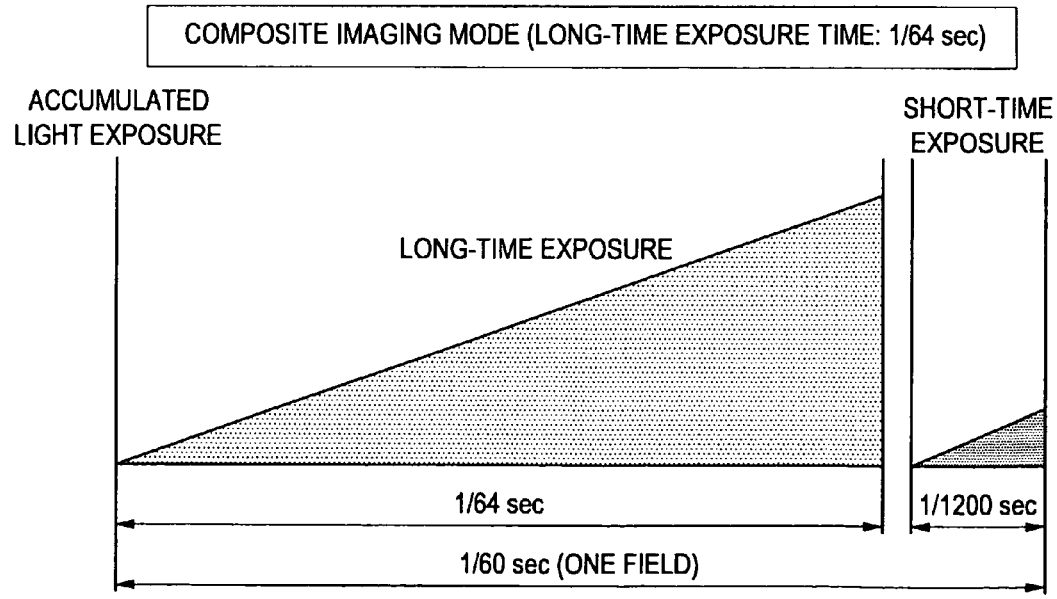
FIG. 2 is an explanatory view exemplifying exposure of a composite imaging mode according to the embodiment.
Figure 3:
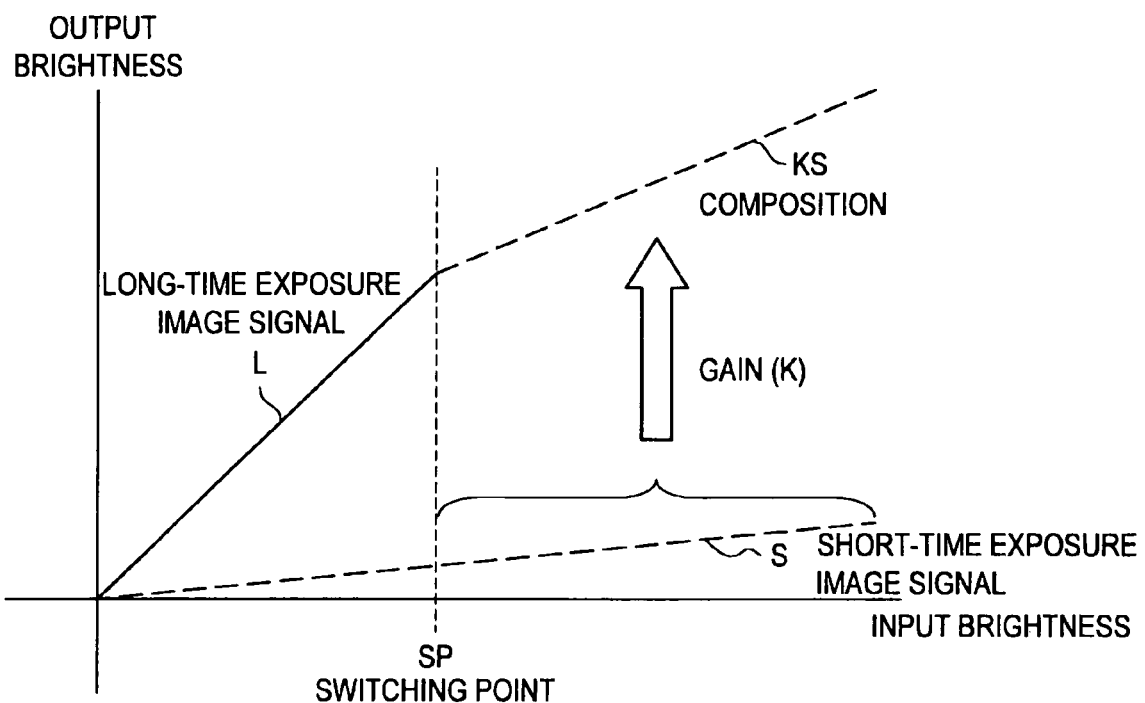
FIG. 3 is an explanatory view of composition processing according to the embodiment.

First, an overview of imaging modes in an imaging apparatus according to an embodiment of the present invention will be provided with reference to FIG. 1 to FIG. 3.

An imaging apparatus according to the present embodiment is a camera capable of performing an imaging operation in composite imaging mode as a wide dynamic range camera and is applied, for example, as a surveillance camera set up indoors or outdoors. The imaging apparatus is capable of performing imaging operations in at least two imaging modes, that is, the normal imaging mode and the composite imaging mode.

The normal imaging mode is a normal imaging operation in a general imaging apparatus. In this normal imaging mode, an object is imaged by an image pickup device to generate one exposure image signal (normal exposure image signal) in the unit time and predetermined signal processing is performed on the exposure image signal by a signal processing circuit to generate pickup image data. The normal imaging mode is suitable for imaging objects with a relatively small brightness difference between a bright portion and a dark portion within an image.

In this normal imaging mode, however, it is difficult to handle a wide dynamic range ranging from a very dark portion to a very bright portion in an object. For example, when imaged indoors while an outside view is visible from the window during daytime hours in fine weather, an outdoor portion will lose gradations and be overexposed if an indoor object is used as the reference for exposure. Conversely, if an outdoor portion is used as the reference for exposure, indoor objects will be underexposed. That is, if a brightness difference in an object is extremely great, it is difficult to obtain a pickup image corresponding to the dynamic range of brightness thereof.

In composite imaging mode, in contrast, a pickup image having a wide dynamic range without overexposure and underexposure can be obtained by, for example, changing the shutter speed by the electronic shutter and performing composition processing of a plurality of exposure image signals having different exposure times. In this composite imaging mode, an object is imaged by an image pickup device to generate two exposure image signals (a long-time exposure image signal and a short-time exposure image signal) in the unit time and a composite image signal is generated by combining the long-time exposure image signal and the short-time exposure image signal by a signal processing circuit. Here, the dynamic range of a composite image signal is wider than that of a long-time exposure image signal or a short-time exposure image signal.

The composite imaging mode in which such a wide dynamic range is obtained is suitable for imaging an object in high contrast (for example, backlight imaging or indoor/outdoor simultaneous imaging) and can advantageously prevent the overexposure in a bright portion and the underexposure in a dark portion within an image described above. However, images obtained in composite imaging mode have lower contrast and thus may sometimes create a sense of discomfort visually so that the normal imaging mode is suitable for imaging objects with a small brightness difference. Therefore, it is preferable that images can be picked up by switching the normal imaging mode and composite imaging mode according to user's preferences or purposes of imaging.

FIG. 1 and FIG. 2 show the exposure time and accumulated light exposure (amount of charge) in one field in a solid image pickup device provided with the imaging apparatus according to the present embodiment. The solid image pickup device is, for example, a CCD or CMOS (Complementary Metal Oxide Semiconductor) sensor array.

FIG. 1 shows a case of the normal imaging mode and an exposure is performed in one field period (for example, 1/60 sec), which is the unit period of imaging. While the exposure time (electronic shutter speed) is set at 1/60 sec in FIG. 1, the exposure time is naturally not limited to 1/60 sec and may be any time less than one field period. The exposure time corresponds to the electronic shutter speed. The exposure time (electronic shutter speed) can optionally be set by the user to any desired value to adjust the light exposure of a pickup image (shutter speed priority exposure). Thus, an exposure of a predetermined exposure time is performed in one field period in an image pickup device to obtain an exposure image signal of one field. Predetermined signal processing is performed on the exposure image signal to generate pickup image data of one field.

FIG. 2 shows a case of the composite imaging mode corresponding to the normal imaging mode in FIG. 1. FIG. 2 is a case in which a long-time exposure of 1/64 sec and a short-time exposure of 1/1200 sec are performed in one field period of 1/60 sec. The long-time exposure time (1/64 sec) in composite imaging mode in FIG. 2 is set to a value corresponding to the exposure time (1/60 sec) in normal imaging mode in FIG. 1. The long-time exposure time and the short-time exposure time are variably controllable. By performing a long-time exposure and a short-time exposure in an image pickup device, a long-time exposure image signal and a short-time exposure image signal with different exposure times are obtained in one field period. Then, pickup image data of one field is generated by combining both image signals to obtain a composite image signal. A long-time exposure and a short-time exposure do not necessarily have to be performed in one field period and processing in which a long-time exposure is performed in some field period and a short-time exposure is performed in the next field period to combine each exposure image signal can also be considered.

As is evident from the relationship between FIG. 1 and FIG. 2, the exposure time in normal imaging mode and the long-time exposure time in composite imaging mode are linked. That is, when switched from the normal imaging mode to the composite imaging mode, the long-time exposure time in composite imaging mode is set in such a way that the exposure time set in normal imaging mode is maintained as much as possible. In the examples in FIG. 1 and FIG. 2, for example, if the exposure time in normal imaging mode is set at "1/60 sec", the long-time exposure time in composite imaging mode after the transition from the normal imaging mode is set at "1/64 sec", which is almost the same. On the other hand, though not shown, if the exposure time in normal imaging mode is set at "1/120 sec", the long-time exposure time in composite imaging mode after the transition from the normal imaging mode is also set at the same "1/120 sec". In this manner, the shutter speed desired by the user can be maintained before and after switching the normal imaging mode to the composite imaging mode and also a visual sense of discomfort of a pickup image can be reduced by suppressing a change in light exposure before and after switching the mode.

Here, composition processing of a long-time exposure image signal and a short-time exposure image signal in composite imaging mode will be described with reference to FIG. 3. FIG. 3 shows input/output brightness characteristics L of a long-time exposure image signal and input/output brightness characteristics S of a short-time exposure image signal.

As shown in FIG. 3, for example, a predetermined brightness value is used as a switching point SP in composition processing. Then, pixels of brightness lower than that of the switching point SP adopt a pixel signal of a long-time exposure image signal. On the other hand, pixels of brightness higher than that of the switching point SP adopt a pixel signal of a short-time exposure image signal. At this point, levels of both images are adjusted by multiplying the short-time exposure image by a gain K, which is an exposure rate (exposure ratio) of the long-time exposure image and the short-time exposure image.

If the exposure ratio of the long-time exposure image and the short-time exposure image is 10:1, exposure of the short-time exposure image is 1/10 of that of the long-time exposure image. However, in terms of the amount of light present, the long-time exposure image signal has ten times the amount of light of a brightness signal level of the short-time exposure image. Therefore, the level of the short-time exposure image signal and that of the long-time exposure image signal are adjusted by multiplying the short-time exposure image signal by 10. The short-time exposure image signal is multiplied by the gain in this manner to obtain, as shown in FIG. 3, characteristics KS whose level is adjusted to that of long-time exposure image signal characteristics.

As a result, a composite image of characteristics L-KS is generated. That is, an image in which there is no underexposure thanks to the long-time exposure image signal in a relatively dark area of an object and there is no overexposure thanks to the short-time exposure image signal in a relatively bright area is obtained as a composite image.

According to the composite imaging mode in which the above techniques are adopted, a dynamic range far wider than that of imaging in normal imaging mode can be obtained. Therefore, an object having a wide dynamic range containing a bright portion and a dark portion in an output image can be imaged, which makes the composite imaging mode suitable when, for example, the interior of a room into which natural light shines or a place with a significant difference of illuminance is imaged. More specifically, the composite imaging mode is suitable for imaging doorways of branches of banks, roads in which traffic conditions are captured and the like where the dynamic range is significantly different depending on the time zone for imaging such as the daytime and nighttime.

In the description that follows, for convenience of description, an exposure operation in normal imaging mode as shown in FIG. 1 will be called "normal exposure" to distinguish from "long-time exposure" and "short-time exposure" in composite imaging mode as shown in FIG. 2. An exposure image signal obtained in normal imaging mode will be called a "normal exposure image signal" to distinguish from a "long-time exposure image signal" and a "short-time exposure image signal" in composite imaging mode. Further, an exposure time in normal imaging mode will be called a "normal exposure time" to distinguish from a "long-time exposure time" and a "short-time exposure time" in composite imaging mode.

[2. Overview of Imaging Mode Switching and Auto Exposure Control]

Next, an overview of the switching method of the normal imaging mode and the composite imaging mode according to the present embodiment will be described.

As a switching method of the normal imaging mode and the composite imaging mode in related art, as described above, a method by which the imaging mode is automatically switched to the normal imaging mode in conditions of a small brightness difference and to the composite imaging mode in conditions of a great brightness difference is known (see, for example, Japanese Patent Application Laid-Open No. 2002-84449). Japanese Patent Application Laid-Open No. 2002-84449 sets whether a brightness difference of a pickup image obtained in normal imaging mode is equal to or greater than a predetermined threshold as a switching condition for switching from the normal imaging mode to the composite imaging mode. Also, a condition whether a difference between the shutter speed (or the aperture) of long-time exposure and that of short-time exposure in composite imaging mode is equal to or less than a constant value is set as a switching condition from the composite imaging mode to the normal imaging mode.

An imaging apparatus equipped with an auto exposure function typically uses auto exposure control during imaging. The auto exposure (AE) is a function to automatically determine an exposure (combination of the f value, shutter speed, and gain) mounted in an imaging apparatus, which is also called an auto exposure. An imaging apparatus having the AE function automatically photographs an appropriate photo by adjusting to brightness of the background and objects. Representative modes of AE include the program AE, aperture priority AE, and shutter speed priority AE.

An imaging apparatus according to Japanese Patent Application Laid-Open No. 2002-84449 typically exercises auto exposure control in normal imaging mode and composite imaging mode. This is also clear from the fact that a difference between the shutter speed (or the aperture) of long-time exposure and that of short-time exposure is used as a switching condition from the composite imaging mode to the normal imaging mode.

However, as described above, when auto exposure control concerning dynamic range expansion (underexposure/overexposure corrections) is exercised in composite imaging mode, brightness fluctuates more wildly when compared with the normal imaging mode and also the exposure time becomes longer. Thus, there is an issue that unnatural video is output when compared with the normal imaging mode before the auto exposure control is completed. Then, as shown in Japanese Patent Application Laid-Open No. 2002-84449, there is an issue that the above unnatural video is output frequently because if auto exposure control is exercised repeatedly in accordance with change of an object during imaging in composite imaging mode, a temporary change of the object is sensitively reacted.

Thus, after being switched from the normal imaging mode to the composite imaging mode, an imaging apparatus according to the present embodiment (1) stops auto exposure control after the auto exposure control is temporarily completed. Then, (2) if the imaging apparatus detects a predetermined brightness change in pickup images obtained in composite imaging mode is detected continuously for a predetermined time or longer after the auto exposure control is temporarily completed, the imaging mode is switched from the composite imaging mode to the normal imaging mode.

With the above configuration, auto exposure control is exercised only once when switched to the composite imaging mode and then, repeated auto exposure control can be prevented from being exercised even if a brightness change occurs in pickup images. Thus, frequent unnatural brightness changes accompanying dynamic range expansion can be prevented in composite images obtained by imaging in composite imaging mode so that stable composite images can be provided as output images.

Also, an object change (scene change) that is not temporary can be detected by detecting a predetermined brightness change in a pickup image for a predetermined time or longer after the auto exposure control in composite imaging mode is stopped. This is, for example, when an object to be imaged changes from an object imaged during composite imaging mode transition to one much darker or brighter than the object. Thus, when an object to be imaged changes during imaging in composite imaging mode, the brightness distribution is different from that of an object just after transition to the composite imaging mode and thus, it is highly probable that it is necessary to exercise auto exposure control again or it is not necessary to perform the composite imaging mode.

Therefore, when the imaging apparatus detects the predetermined brightness change in composite imaging mode for the predetermined time or longer, the imaging apparatus switches from the composite imaging mode to the normal imaging mode before restarting the auto exposure control.

An imaging apparatus and an imaging method that perform the above mode switching and auto exposure control will be described below in detail.

[3. Configuration of the Imaging Apparatus]

Figure 4:
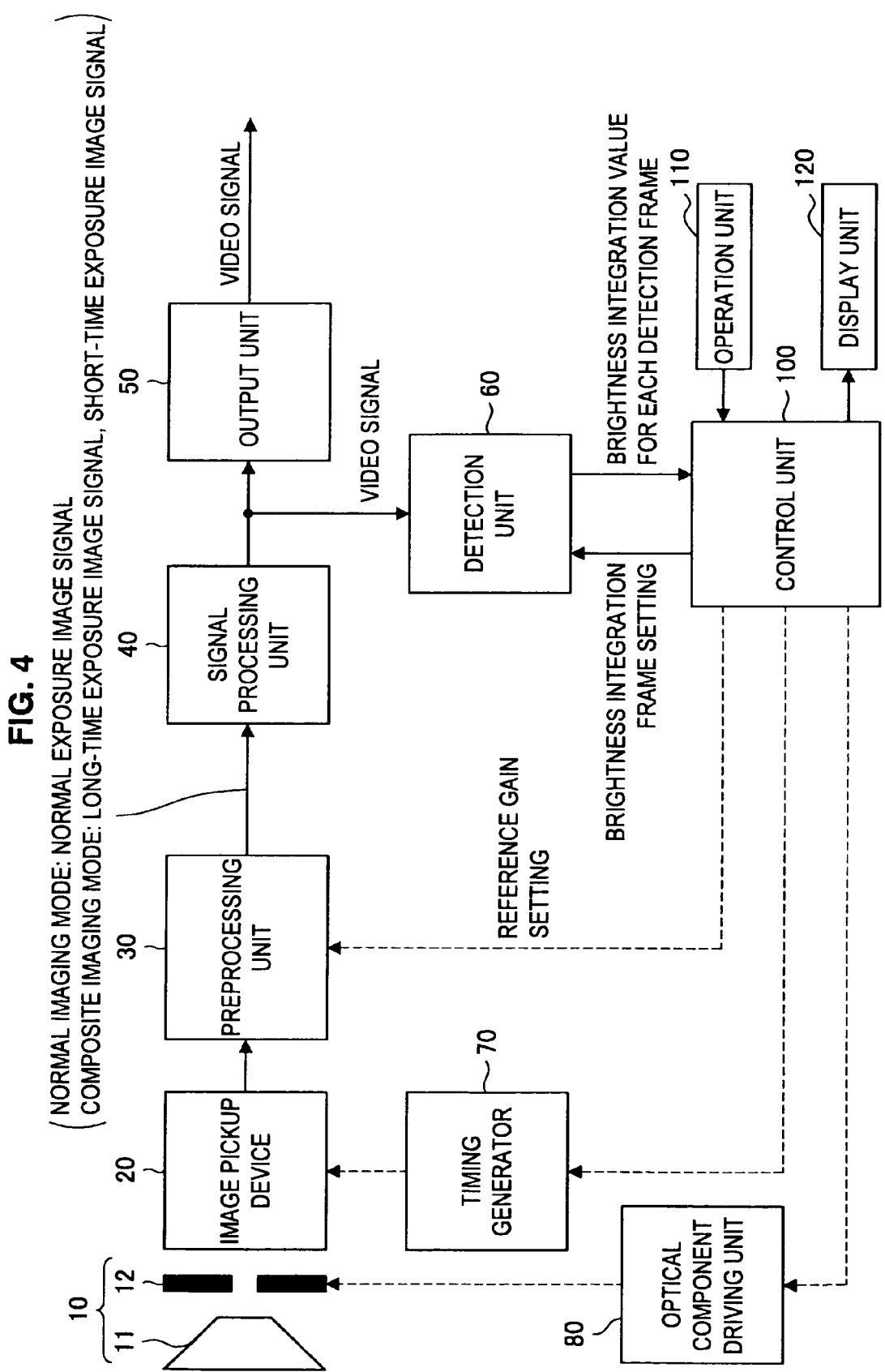
FIG. 4 is a block diagram showing the configuration of an imaging apparatus according to the embodiment.

Next, the configuration of an imaging apparatus according to the present embodiment will be described with reference to FIG. 4. FIG. 4 is a block diagram showing an outline configuration of an imaging apparatus according to the present embodiment.

As shown in FIG. 4, the imaging apparatus includes an imaging optical system 10, an image pickup device 20, a preprocessing unit 30, a signal processing unit 40, an output unit 50, a detection unit 60, a timing generator 70, an optical component driving unit 80, a control unit 100, an operation unit 110, and a display unit 120. Among these units, the imaging optical system 10, the image pickup device 20, the preprocessing unit 30, the signal processing unit 40, the timing generator 70, and the optical component driving unit 80 are concrete examples of an imaging processing unit of the present invention. The detection unit 60 is a concrete example of a brightness detection unit of the present invention. The control unit 100 is a concrete example of a control unit of the present invention.

The imaging optical system 10 includes optical components such a lens 11, an optical filter that removes unnecessary wavelengths, and a diaphragm 12. Light incident from an object is led to the image pickup device 20 via optical components in the imaging optical system 10.

The image pickup device 20 is constituted by, for example, a solid image pickup device such as the CCD and CMOS and generates a pickup image signal by picking up an incident object image. The image pickup device 20 performs a photoelectric conversion of light (object image) led via the imaging optical system 10 to output an electric signal as an exposure image signal. In the present embodiment, the image pickup device 20 performs different exposure processing in normal imaging mode and composite imaging mode. That is, in normal imaging mode, as shown in FIG. 1, the image pickup device 20 performs a normal exposure in which an exposure of an object image is performed in a predetermined exposure time in one field period and outputs an electric signal as a normal exposure image signal. On the other hand, in composite imaging mode, as shown in FIG. 2, the image pickup device 20 performs a long-time exposure and a short-time exposure in one field period to output an electric signal as a long-time exposure image signal and a short-time exposure image signal in a time divided manner.

The image pickup device 20 is not limited to the configuration using a solid image pickup device. For example, the image pickup device 20 may have a configuration that uses a non-solid image pickup device such as a pickup tube. For a non-solid image pickup device, a long-time exposure and a short-time exposure can be performed using a mechanical shutter or liquid crystal shutter, or the exposure time of the normal exposure, long-time exposure and short-time exposure can be changed.

The preprocessing unit 30 is a so-called analog front end that preprocesses an exposure image signal. For example, the preprocessing unit 30 performs CDS (correlated double sampling) processing, gain processing by a programmable gain amplifier (PGA) or A/D conversion processing on an electric signal as an exposure image signal output from the image pickup device 20. Then, the preprocessing unit 30 supplies the exposure image signal on which the preprocessing has been performed to the signal processing unit 40. That is, the preprocessing unit 30 supplies a normal exposure image signal to the signal processing unit 40 in normal imaging mode and a long-time exposure image signal and a short-time exposure image signal to the signal processing unit 40 in composite imaging mode.

The signal processing unit 40 performs predetermined signal processing for each of the normal imaging mode and the composite imaging mode to generate a video signal of pickup image data. More specifically, in normal imaging mode, the signal processing unit 40 performs, for example, gamma correction processing or white balance processing on an input normal exposure image signal to generate a video signal of pickup image data. On the other hand, in composite imaging mode, the signal processing unit 40 performs composition processing described with reference to FIG. 3 on an input long-time exposure image signal and short-time exposure image signal to generate a composite image signal. That is, the signal processing unit 40 performs timing adjustments of the long-time exposure image signal and short-time exposure image signal supplied in a time divided manner, color balance correction processing, gain processing to match the brightness level of the short-time exposure image signal to that of the long-time exposure image signal and composition processing. The signal processing unit 40 also performs gamma correction processing or white balance processing on a composite image signal to generate a video signal of pickup image data. The signal processing unit 40 outputs a video signal of pickup image data generated in each mode described above to the output unit 50 and the detection unit 60.

The output unit 50 performs processing for the display in a monitor display or processing for transmission to an external device on a video signal of pickup image data input from the signal processing unit 40.

The detection unit 60 detects a brightness value of a pickup image represented by a normal exposure image signal in normal imaging mode and that of a pickup image represented by a composite image signal in composite imaging mode. A brightness integrated value in the predetermined detection frame set by the control unit 100 is used as the brightness value, but an average value of brightness or the like in any area may also be used. More specifically, the detection unit calculates a brightness integrated value according to the predetermined photometric method for a video signal of pickup image data input from the signal processing unit 40 and supplies the brightness integrated value to the control unit 100. In this case, the detection unit 60 selects the photometric method to be executed according to instructions from the control unit 100. Any photometric method such as the centerweighted metering method, evaluative metering method, averaging metering method, and selective area metering method may be used as the photometric method. While the detection frame inside an image area is different depending on the photometric method, the detection unit 60 supplies the brightness integrated value for each detection frame set by the photometric method to be executed to the control unit 100.

The control unit 100 is constituted by, for example, a micro controller having a CPU (Central Processing Unit), ROM (Read Only Memory), RAM (Random Access Memory), and a flash memory and controls an operation of each unit of the imaging apparatus described above.

Particularly, the control unit 100 according to the present embodiment exercises control to cause the image pickup device 20, the preprocessing unit 30, the signal processing unit 40, the timing generator 70, and the optical component driving unit 80 as imaging processing units to perform an imaging operation for each of the normal imaging mode and the composite imaging mode. At this point, the control unit 100 determines whether predetermined switching conditions are met to control switching of the normal imaging mode and the composite imaging mode.

The control unit 100 also sets the brightness integrated frame (detection frame) for the detection unit 60. Further, the control unit 100 exercises auto exposure control that automatically adjusts light exposure of a pickup image by adjusting the diaphragm 12, the setting of the electronic shutter speed of the image pickup device 20 and the setting of the reference gain of AGC of the preprocessing unit 30. A ROM in the control unit 100 has programs causing the control unit 100 to perform various kinds of control processing described above stored therein and the control unit 100 performs arithmetic/control processing necessary for the control described above based on the programs.

Programs according to the present embodiment are programs that cause the control unit 100, which is a microcomputer, to perform processing of the control unit 100 described above. The programs can be stored in a storage apparatus (HDD, ROM, flash memory or the like) contained in the imaging apparatus in advance. Such programs may also be stored in a removable recording medium such as a CD, DVD, blu-ray disk, and memory card before being provided to the imaging apparatus or may be downloaded to the imaging apparatus via a network such as a LAN and the Internet.

The timing generator 70 (hereinafter, referred to as "TG70") controls the electronic shutter speed of the image pickup device 20 based on instructions from the control unit 100. The TG70 generates operation pulses necessary for the image pickup device 20 such as the CCD. For example, the TG70 generates various kinds of pulses such as four-phase pulses for vertical transfer, field shift pulses, two-phase pulses for horizontal transfer, and shutter pulses, which are supplies to the image pickup device 20. The image pickup device 20 can be driven (electronic shutter function) by the TG70. The TG70 controls the electronic shutter speed (exposure time) of the image pickup device 20 based on instructions from the control unit 100.

For example, when the normal imaging mode is instructed from the control unit 100, as shown in FIG. 1, the TG70 causes the image pickup device 20 to perform a normal exposure whose exposure time is relatively long. When the composite imaging mode is instructed, as shown in FIG. 2, the TG70 causes the image pickup device 20 to perform a long-time exposure whose exposure time is relatively long and a short-time exposure whose exposure time is relatively short in one field period. Illustrated values for the normal exposure time in normal imaging mode and the long-time exposure time and short-time exposure time in composite imaging mode may be changed to other values.

The optical component driving unit 80 drives optical components in the imaging optical system 10 based on instructions from the control unit 100. In the present embodiment, the optical component driving unit 80 functions as a driving circuit unit that drives at least the diaphragm 12 to adjust the amount of incident light.

The operation unit 110 and the display unit 120 function as a user interface. The operation unit 110 outputs operation information to the control unit 100 in accordance with a user operation. The display unit 120 displays information to be presented to the user such as the operating state, time information, mode information, and messages in accordance with instructions from the control unit 100. The operation unit 110 and the display unit 120 may be constructed as separate devices from the imaging apparatus. Information to be displayed in the display unit 120 may be superimposed as a character image or letter image on a video signal of pickup image data in the output unit 50 before a monitor display being caused to output and display a pickup image.

In an imaging apparatus according to the present embodiment, as described above, the units 10, 20, 30, 40, 70, and 80 constituting the imaging processing units perform an imaging operation in normal imaging mode or composite imaging mode under the control of the control unit 100. In composite imaging mode, a long-time exposure image signal and a short-time exposure image signal are sent from the preprocessing unit 30 to the signal processing unit 40 and both image signals are combined by the signal processing unit 40. In normal imaging mode, on the other hand, only a normal exposure image signal (corresponding to a long-time exposure image signal in composite imaging mode) is sent from the preprocessing unit 30 to the signal processing unit 40 and the signal processing unit 40 performs no composition processing.

[4. Processing Flow of Imaging Operations]

Next, an imaging method of an imaging apparatus according to the present embodiment will be described with reference to FIG. 5. FIG. 5 is a flow chart showing overall processing of imaging operations by an imaging apparatus according to the present embodiment.

As shown in FIG. 5, when imaging is started, the imaging apparatus images an object by performing an imaging operation in normal imaging mode (S10). In normal imaging mode, the control unit 100 provides instructions about the preset predetermined exposure time (electronic shutter speed) to the TG70 and the TG70 drives the image pickup device 20 in timing in accordance with the exposure time. The image pickup device 20 generates a normal exposure image signal by imaging an object in the aforementioned set exposure time (that is, the normal exposure time) and performing a photoelectric conversion of the object image. FIG. 1 shown below shows a case in which one normal exposure time ($1/60$ sec) is set in one field and a normal exposure image is picked up in the exposure time of $1/60$ sec.

The exposure time (electronic shutter speed) in normal imaging mode is not limited to $1/60$ sec and can be changed to any value. The control unit 100 of the imaging apparatus can set the exposure time (electronic shutter speed) at a user-desired value such as $1/120$ sec, $1/250$ sec, and $1/500$ sec in accordance with instructions from the user. Accordingly, the user can adjust light exposure of a pickup image by specifying the desired exposure time (shutter speed priority exposure). If the exposure time becomes longer (the electronic shutter speed becomes slower), light exposure of an image signal increases so that a dark object can be imaged more suitably. If the exposure time becomes shorter (the electronic shutter speed becomes faster), on the other hand, light exposure of an image signal decreases so that a bright object or a fast object can be imaged more suitably.

In normal imaging mode, as described above, predetermined preprocessing (such as CDS processing, gain processing by PGA, and A/D conversion processing) is performed by the preprocessing unit 30 on a normal exposure image signal generated by the image pickup device 20. Further, the signal processing unit 40 performs signal processing on a normal exposure image signal digitized by the preprocessing unit 30 and then, outputs a video signal (signal that represents pickup image data) after the signal processing to the output unit 50 and the detection unit 60.

Also in normal imaging mode, the imaging apparatus constantly exercises auto exposure (AE) control (S20). The control unit 100 of the imaging apparatus controls the diaphragm 12, the image pickup device 20, and the preprocessing unit 30 by performing the auto exposure control so as to control the exposure (light exposure) of a pickup image obtained from the normal exposure image signal to an appropriate value.

More specifically, the detection unit 60 adds up brightness values of pixels in a predetermined detection frame (brightness integrated frame) by detecting a video signal of a pickup image input from the signal processing unit 40 in normal imaging mode and outputs the brightness integrated value to the control unit 100. The control unit 100 uses the brightness integrated value received from the detection unit to perform photometric processing of a pickup image to determine a difference (brightness difference) between the brightness value of the current pickup image and a target brightness value. Any photometric method such as the centerweighted metering method, evaluative metering method, averaging metering method, and selective area metering method may be used as the photometric method. Then, the control unit 100 calculates amounts of control (such as the f value, electronic shutter speed and reference gain value) necessary for the diaphragm 12, the TG70, and the PGA of the preprocessing unit 30 based on the determined brightness difference and provides instructions to each unit. General auto exposure processing in normal imaging mode is performed as described above so that a pickup image represented by a normal exposure image signal is controlled to an appropriate light exposure.

The auto exposure control in normal imaging mode is exercised by mainly controlling the f value of the diaphragm and the reference gain value of the PGA. However, the exposure may be controlled by the electronic shutter speed being controlled by the TG70. If, for example, a pickup image is still bright after the aperture of the diaphragm 12 is maximally reduced, the control unit 100 may be controlled to make the shutter speed faster (that is, the normal exposure time shorter) to make exposure adjustments. Also in an ordinary digital camera or surveillance camera, light exposure can be controlled by using not only the diaphragm 12 and gain, but also the electronic shutter speed of the image pickup device 20.

Further, during imaging in normal imaging mode, the control unit 100 constantly or periodically determines whether to switch the imaging mode from the normal imaging mode to the composite imaging mode based on a brightness difference between a bright portion and a dark portion of an object to be imaged (S30 to S40).

More specifically, the control unit 100 first detects the brightness rate of a bright portion and a dark portion of an object in a pickup image based on the brightness integrated value of each detection frame obtained by the detection unit 60 (S30). The brightness rate is an example of the brightness difference between a bright portion and a dark portion of an object. Here, detection processing of a bright portion and a dark portion will be illustrated with reference to FIG. 6A. FIG. 6A is an explanatory view showing how a pickup image 1 in which an object picked up against the light is divided and photometric measurement is made. The pickup image 1 in FIG. 6A is obtained by imaging an object against the light that has a bright upper part with a high level of brightness, a dark middle part with a low level of brightness, and other parts with an intermediate level of brightness.

As shown in FIG. 6A, the control unit 100 divides the pickup image 1 into, for example, 12 areas of 4 (horizontal)×3 (vertical) and sets a detection frame of each area for the detection unit 60. The detection unit 60 detects a video signal input from the signal processing unit 40 and adds up the brightness values of each detection frame to output the brightness integrated value of each detection frame to the control unit 100. The control unit 100 determines a darkest area (dark portion) 2 and a brightest area (bright portion) 3 in the pickup image 1 based on the brightness integrated value of each detection frame. Then, the control unit 100 determines the brightness rate (YM) by dividing, as shown by the formula shown below, the brightness integrated value (YH) of the brightest area by the brightness integrated value (YL) of the darkest area.

Brightness rate (YM)=[brightness integrated value (YH) of the brightest area]/[brightness integrated value (YL) of the darkest area]

The brightness rate (YM) is the ratio of the brightness of a bright portion of an object imaged in normal imaging mode to that of a dark portion and corresponds to the brightness difference of the pickup image 1. The calculation method of the brightness rate is not limited to the above example and can be changed when necessary. For example, the setting of detection frames is not limited to the example in FIG. 6A and more or less detection frames may be set in any arrangement. Moreover, instead of determining the brightness integrated value for each detection frame, an average brightness value for each detection frame may be determined.

Next, the control unit 100 determines whether to switch the imaging mode from the normal imaging mode to the composite imaging mode using the brightness rate (YM) calculated above (S40). Here, the control unit 100 compares the above brightness rate (YM) obtained at S30 and a predetermined threshold (C1) to determine whether the brightness rate is equal to or greater than the threshold (C1). Here, the threshold (C1) is a value indicating the lower limit of the brightness rate that makes it necessary to switch from the normal imaging mode to the composite imaging mode. The threshold (C1) is set to the minimum brightness rate value that needs the composite imaging mode in accordance with performance of the imaging apparatus. If, for example, the brightness rate is about 5 and an imaging apparatus has performance that prevents an occurrence of overexposure or underexposure in a pickup image even in normal imaging mode, the threshold (C1) is set, for example, at 6.

If, as a result of a determination at S40, the brightness rate (YM) is equal to or greater than the predetermined threshold (C1), the control unit 100 determines that it is necessary to switch from the normal imaging mode to the composite imaging mode and proceeds to step S50. In this case, an object being imaged has a brightness rate that makes the composite imaging mode necessary and thus, the imaging mode of the imaging processing unit is switched from the normal imaging mode to the composite imaging mode at S50. If, on the other hand, the brightness rate (YM) is less than the predetermined threshold (C1), the control unit 100 determines that it is not necessary to switch to the composite imaging mode and returns to step S10 to continue imaging in normal imaging mode.

Thus, whether the brightness rate (YM) of an object being imaged in normal imaging mode is equal to or greater than the threshold (C1) of the brightness rate that makes the application of the composite imaging mode necessary can be determined by this step S40. Thus, erroneous switching to the composite imaging mode when an object with a low brightness rate that makes the application of the composite imaging mode unnecessary is being imaged in normal imaging mode can be prevented.

After being switched from the normal imaging mode to the composite imaging mode in accordance with the brightness rate (YM) detected in normal imaging mode as described above, the imaging apparatus performs an imaging operation in composite imaging mode to image an object (S50). Since, as described above, the TG70 can set two different electronic shutter speeds, the imaging apparatus can generate two exposure image signals (that is, a long-time exposure image signal and a short-time exposure image signal) having different light exposures in composite imaging mode.

In composite imaging mode, the control unit 100 provides instructions about a long-time exposure time corresponding to the normal exposure time (electronic shutter speed) and a predetermined short-time exposure time to the TG70, and the TG70 drives the image pickup device 20 in timing in accordance with these exposure times. The image pickup device 20 images an object in the long-time exposure time and the short-time exposure time in one field to generate a long-time exposure image signal and a short-time exposure image signal. The signal processing unit 40 combines the long-time exposure image signal and short-time exposure image signal digitized by the preprocessing unit 30 at the specific switching point SP, as shown in FIG. 3, to generate a composite image signal with an expanded dynamic range. Then, the signal processing unit 40 performs predetermined signal processing on the composite image signal to generate a video signal of pickup image data, which is output to the output unit 50 and the detection unit 60.

FIG. 2 shown above, for example, is a case in which two different exposure times ($1/64$ sec and $1/1200$ sec) are set in one field in composite imaging mode and the image pickup device 20 generates two exposure image signals with different light exposures. That is, a long-time exposure image whose exposure time is $1/64$ sec and a short-time exposure image whose exposure time is $1/1200$ sec are picked up. A value corresponding to the normal exposure time ($1/60$ sec) in normal imaging mode in FIG. 1 is used as the long-time exposure time in FIG. 2. Thus, when the shutter speed priority exposure or the like is applied, the normal exposure time in normal imaging mode is reflected in the long-time exposure time in composite imaging mode so that changes in quality when the imaging mode is switched can be reduced.

In composite imaging mode, the imaging apparatus exercises auto exposure (AE) control only once immediately after switching from the normal imaging mode to the composite imaging mode (S60) and after the auto exposure control is completed (that is, the auto exposure converges) (S70), the auto exposure control is stopped (S80).

That is, when a transition to the composite imaging mode occurs, the imaging apparatus exercises auto exposure control to automatically control light exposures of the long-time exposure image signal and short-time exposure image signal to adjust the exposure of a pickup image represented by a composite image signal (S60). The control unit 100 of the imaging apparatus controls the diaphragm 12, the image pickup device 20, and the preprocessing unit 30 by performing the auto exposure control so as to control the exposure (light exposure) of a pickup image obtained by combining the long-time exposure image signal and short-time exposure image signal to an appropriate value. The auto exposure control in composite imaging mode includes long-time exposure control to control the light exposure of a long-time exposure image signal to correct underexposure in a pickup image and short-time exposure control to control the light exposure of a short-time exposure image signal to correct overexposure in a pickup image. Further, the auto exposure control in composite imaging mode according to the present embodiment includes, in addition to the long-time exposure control and short-time exposure control, processing to correct the target brightness values of the long-time exposure control and short-time exposure control in accordance with the brightness distribution of a composite image obtained by the exposure control.

Figure 7:
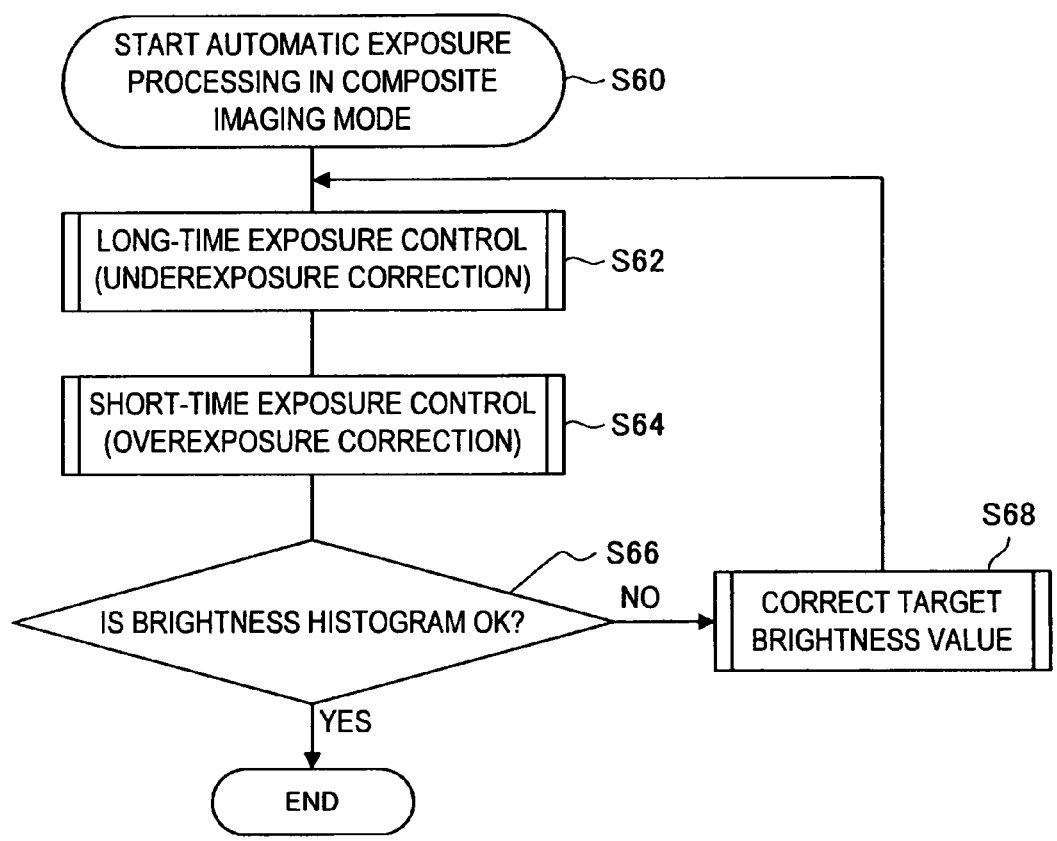
FIG. 7 is a flow chart showing auto exposure control in composite imaging mode according to the embodiment.

Here, the auto exposure control in composite imaging mode according to the present embodiment (S60) will be described with reference to FIG. 7 to FIG. 11. FIG. 7 is a flow chart showing auto exposure control in composite imaging mode according to the present embodiment.

As shown in FIG. 7, the long-time exposure control (S62) and the short-time exposure control (S64) are performed in the auto exposure control in composite imaging mode. First, in order to correct underexposure of a low-brightness portion (dark portion) in a composite image, the control unit 100 of the imaging apparatus performs the long-time exposure control so as to adjust the current brightness value obtained by detecting the dark portion of the composite image to a first target brightness value (Yb) (S62). Here, the composite image means a pickup image obtained from a composite image signal obtained by combining a long-time exposure image signal and a short-time exposure image signal in composite imaging mode. Next, in order to correct overexposure of a high-brightness portion (bright portion) in the composite image, the control unit 100 performs the short-time exposure control so as to adjust the current brightness value obtained by detecting the bright portion of the composite image to a second target brightness value (Yw) (S64).

Then, the control unit 100 checks the brightness distribution (for example, a brightness histogram) of the composite image obtained by the long-time exposure control and short-time exposure control to determine whether the brightness distribution is appropriate (S66). If the brightness distribution leans to a low-brightness area or high-brightness area, the brightness distribution is determined to be inappropriate. If the brightness distribution is determined to be inappropriate, the control unit 100 corrects the target brightness value (Yb) used for long-time exposure control at S62 and/or the target brightness value (Yw) used for short-time exposure control at S64 (S68). Then, the control unit 100 repeats the long-time exposure control at S62 described above and the short-time exposure control using the target brightness values (Yb, Yw) after being corrected (S62 to S64).

Completion of the long-time exposure control (S62), the short-time exposure control (S64), and the check of brightness distribution (S66) as described above means that auto exposure control for the composite image has been completed.

Figure 8:
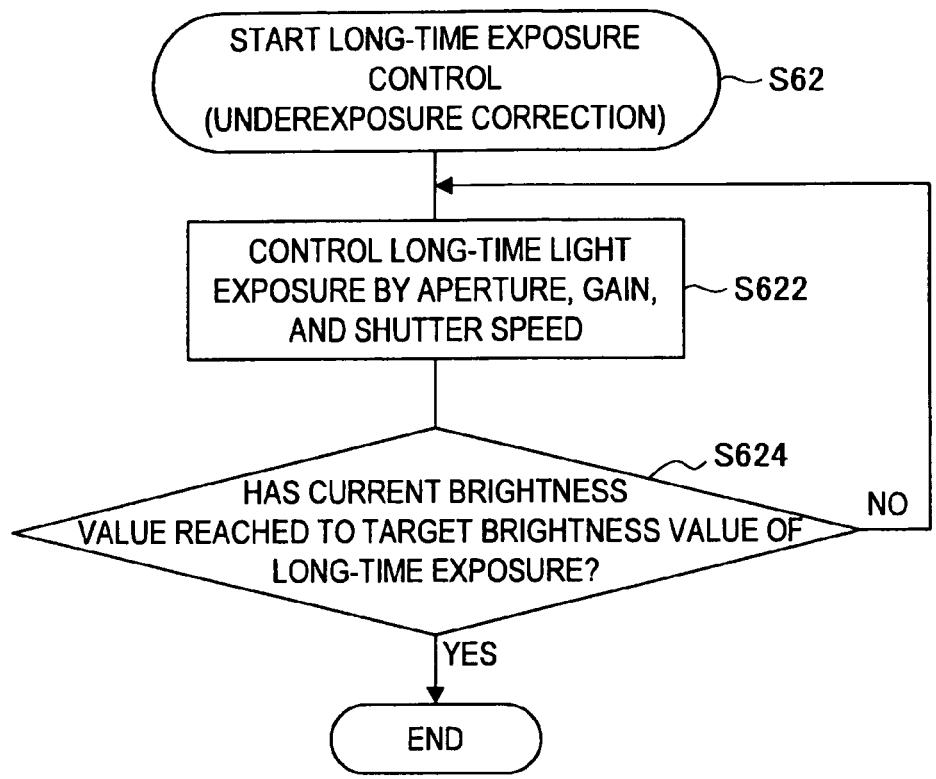
FIG. 8 is a flow chart showing details of long-time exposure control in FIG. 7.
Figure 9:
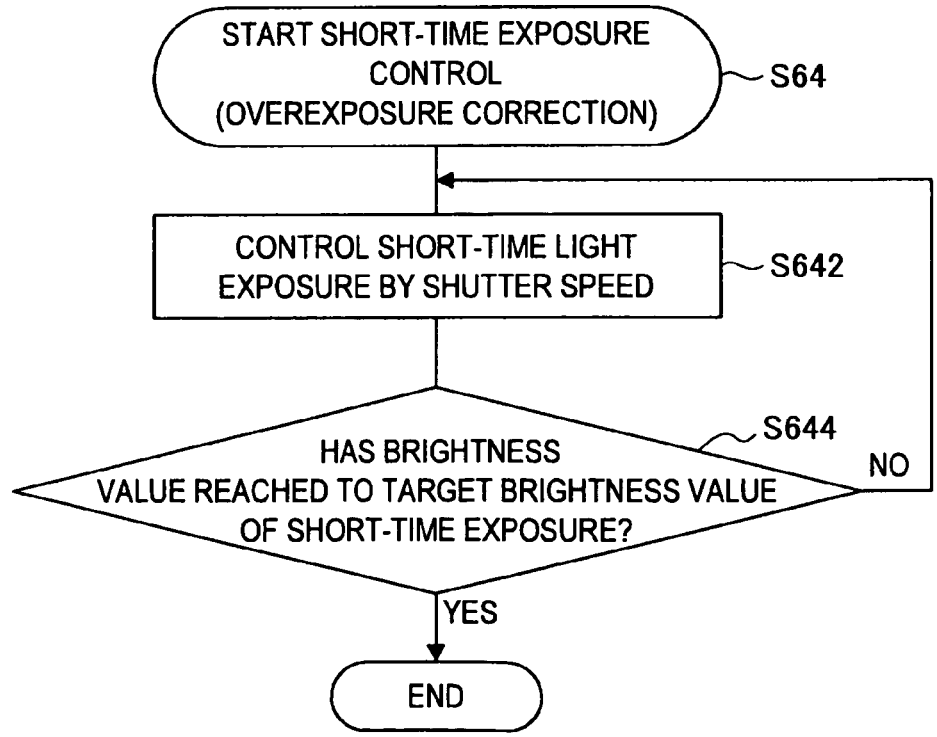
FIG. 9 is a flow chart showing details of short-time exposure control in FIG. 7.
Figure 10:
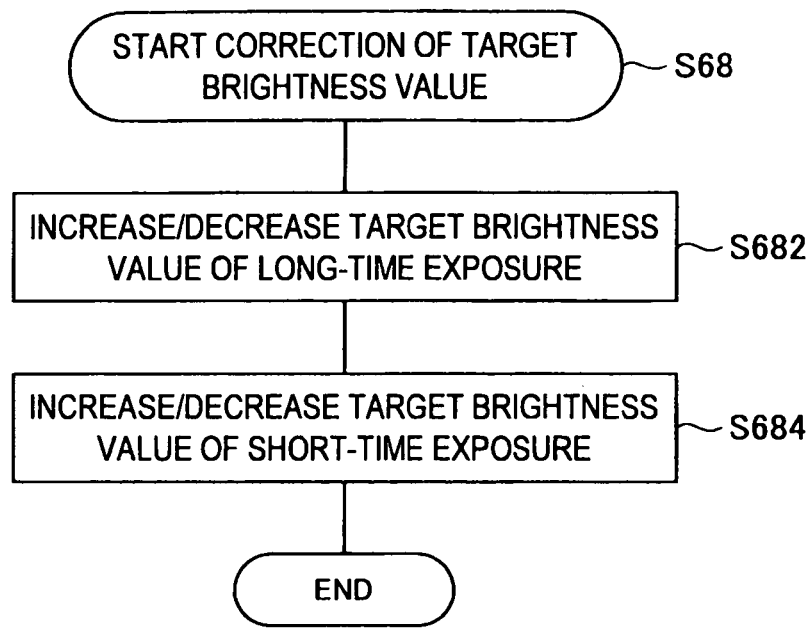
FIG. 10 is a flow chart showing details of correction processing of a target brightness value in FIG. 7.
Figure 11:
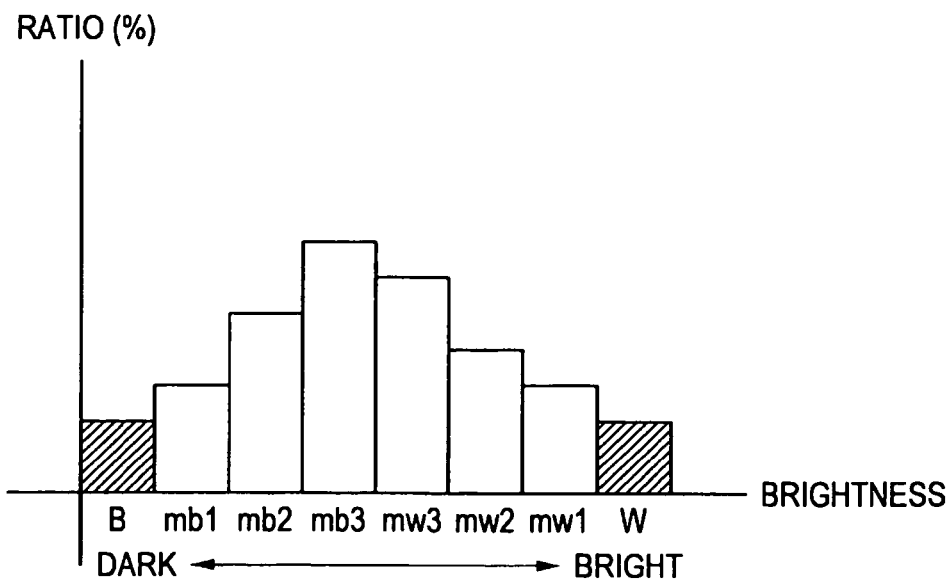
FIG. 11 is an explanatory view illustrating a brightness histogram according to the embodiment.

Processing at S62 to S68 in FIG. 7 will be described below in detail with reference to FIG. 8 to FIG. 11. FIG. 8 to FIG. 10 are flow charts showing details of the long-time exposure control (S62), the short-time exposure control (S64), and the correction processing of the target brightness value (S68) in FIG. 7 respectively. FIG. 11 is an explanatory view illustrating a brightness histogram according to the present embodiment.

First, the long-time exposure control (S62) in FIG. 7 will be described with reference to FIG. 8. As shown in FIG. 8, the control unit 100 adjusts a brightness value (YL) of a dark portion of a composite image to the appropriate brightness value (the first target brightness value Yb) (S624) by controlling light exposure of a long-time exposure image signal by using a brightness integrated value obtained from the detection unit 60 (S622). In the long-time exposure control, the control unit 100 controls at least any one of the f value of the diaphragm 12 of the imaging processing unit, the gain value of the AGC of the preprocessing unit 30, and the electronic shutter speed for long-time exposure of the image pickup device 20.

More specifically, the detection unit 60 adds up brightness values of pixels in a predetermined detection frame by detecting a video signal of a composite image input from the signal processing unit 40 in composite imaging mode and outputs the brightness integrated value to the control unit 100. The control unit 100 uses the brightness integrated value received from the detection unit 60 to perform photometric processing of the composite image to determine a brightness difference between the current brightness value (YL) of the darkest portion (dark portion) in the composite image, as shown in FIG. 6A, and the first target brightness value (Yb) for long-time exposure (S622). The first target brightness value (Yb) is preset to such a brightness value that the dark portion in the composite image appears with suitable brightness. Then, the control unit 100 calculates amounts of control (such as the f value, electronic shutter speed for long-time exposure and reference gain value) necessary for the diaphragm 12, the TG70, and the PGA of the preprocessing unit 30 based on the determined brightness difference and provides instructions to each unit (S622). Accordingly, the diaphragm 12 opens more widely, the gain of the PGA increases, or the electronic shutter speed for long-time exposure lengthens so that light exposure of the long-time exposure image signal increases and the dark portion of the composite image brightens.

Then, the control unit 100 compares the current brightness value (YL) obtained by detecting the composite image after being corrected and the first target brightness value (Yb) (S624). Then, if the current brightness value (YL) of the dark portion reaches the first target brightness value (Yb), underexposure has been eliminated and thus, the control unit 100 ends the long-time exposure control. If, on the other hand, the current brightness value (YL) of the dark portion does not reach the first target brightness value (Yb), the control unit 100 returns to S622 to control each unit so as to further increase light exposure of the long-time exposure image signal.

In the long-time exposure control, as described above, the imaging apparatus performs normal auto exposure (AE) processing until the brightness of a dark portion of a composite image reaches appropriate target brightness. In this case, the control unit 100 detects the brightness of an underexposed dark portion and increases light exposure (sensitivity) of the long-time exposure image signal until the brightness of the dark portion reaches appropriate target brightness. In the long-time exposure control described above, an underexposure correction is usually realized by the diaphragm 12 being opened widely or the gain of the PGA being increased. However, if the brightness of the dark portion does not reach the target brightness even if the diaphragm 12 is opened maximally, exposure control may be exercised by lengthening the electronic shutter speed for long-time exposure.

Next, the short-time exposure control (S64) in FIG. 7 will be described with reference to FIG. 9. As shown in FIG. 9, the control unit 100 adjusts a brightness value (YH) of a bright portion of the composite image to the appropriate brightness value (the second target brightness value Yw) (S644) by controlling light exposure of a short-time exposure image signal by using the brightness integrated value obtained from the detection unit 60 (S642). In the short-time exposure control, the control unit 100 controls the electronic shutter speed for short-time exposure of the image pickup device 20 of the imaging processing unit.

More specifically, the detection unit 60 adds up brightness values of pixels in a predetermined detection frame by detecting a video signal of a composite image input from the signal processing unit 40 in composite imaging mode and outputs the brightness integrated value to the control unit 100. The control unit 100 uses the brightness integrated value received from the detection unit 60 to perform photometric processing of the composite image to determine a brightness difference between the current brightness value (YH) of the brightest portion (bright portion) in the composite image, as shown in FIG. 6A, and the second target brightness value (Yw) for short-time exposure (S622). The second target brightness value (Yw) is preset to such a brightness value that the bright portion in the composite image appears with suitable brightness. Then, the control unit 100 calculates an amount of control (electronic shutter speed for short-time exposure) necessary for the TG70 based on the determined brightness difference and provides instructions to the TG70 (S622). Accordingly, the electronic shutter speed for short-time exposure in the image pickup device 20 shortens so that light exposure of the short-time exposure image signal decreases and the bright portion of the composite image darkens.

Then, the control unit 100 compares the current brightness value (YH) of the bright portion obtained by detecting the composite image after being corrected and the second target brightness value (Yw) (S644). Then, if the current brightness value (YH) of the bright portion reaches the second target brightness value (Yw), overexposure has been eliminated and thus, the control unit 100 ends the short-time exposure control. If, on the other hand, the current brightness value (YH) of the bright portion does not reach the second target brightness value (Yw), the control unit 100 returns to S642 to control each unit so as to further decrease light exposure of the short-time exposure image signal.

In the short-time exposure control, as described above, the imaging apparatus performs short-time exposure control until the brightness of a bright portion of a composite image reaches appropriate target brightness. In this case, the control unit 100 detects the brightness of an overexposed bright portion and decreases light exposure of a short-time exposure image signal by making the electronic shutter speed for short-time exposure shorter than an initial value (for example, 1/1200 sec) until the brightness of the bright portion reaches appropriate target brightness. In the short-time exposure control described above, only the electronic shutter speed for short-time exposure is usually controlled, and the diaphragm 12 and the gain of the PGA are not controlled. This is because the diaphragm 12 and the gain are used for long-time exposure control with a broad control width and if the f value or the gain of the PGA is changed in short-time exposure control, the long-time exposure control performed previously may be affected. Thus, in short-time exposure control, the f value of the diaphragm 12 and the gain of the PGA are fixed to values set in the long-time exposure control and only the electronic shutter speed for short-time exposure is controlled.

Next, check processing (S66) of a brightness histogram and correction processing (S68) of the target brightness value in FIG. 7 will be described with reference to FIG. 10 and FIG. 11.

The detection unit 60 described above can generate a brightness integrated value of each detection frame of a composite image and a brightness histogram and transmit the brightness integrated value and the brightness histogram to the control unit 100 for each field by detecting the brightness of the composite image input from the signal processing unit 40. The control unit 100 checks the brightness histogram (S66) to correct the first target brightness value (Yb) for the long-time exposure control or the second target brightness value (Yw) for the short-time exposure control in accordance with the brightness distribution represented by the brightness histogram (S68).

FIG. 11 shows an example of the brightness histogram according to the present embodiment. In this example, brightness from a black level B to a white level W is divided into eight brightness ranges of "B", "mb1", "mb2", "mb3", "mw3", "mw2", "mw1", and "W" and the ratio (%) of brightness of all pixels in one field image is shown for each of the eight brightness ranges.

When auto exposure control shown in FIG. 7 is exercised, the control unit 100 sets the initial value of the first target brightness value (Yb) used for long-time exposure control (underexposure correction) to a predetermined brightness value that enables creation of a composite image without underexposure. The control unit 100 also sets the initial value of the second target brightness value (Yw) used for short-time exposure control (overexposure correction) to a predetermined brightness value that enables creation of a composite image without overexposure.

Then, after receiving a brightness histogram of the current composite image from the detection unit 60, the control unit 100 checks the brightness histogram to determine whether the black portion (B) and the white portion (W) of the brightness histogram are less than a predetermined ratio (for example, 5% or 10%) (S66). If, as a result, the black portion (B) and the white portion (W) are equal to or greater than the predetermined ratio, the control unit 100 corrects the first target brightness value (Yb) and the second target brightness value (Yw) so that underexposure and overexposure can be eliminated (S68).

More specifically, the control unit 100 detects underexposure by inspecting the ratio of the black portion (B) in the brightness histogram. Then, if the black portion (B) is equal to or greater than the predetermined ratio (for example, 5% or 10%), as shown in FIG. 10, the control unit 100 increases/decreases the target brightness value (Yb) of long-time exposure control in accordance with the ratio (S682). The control unit 100 updates the target brightness value (Yb) to, for example, a value (Yb+Cb) obtained by adding a fixed value (Cb) to the current target brightness value (Yb). That is, the target brightness value (Yb) is updated in a direction to increase long-time light exposure.

The control unit 100 also detects overexposure by inspecting the ratio of the white portion (W) in the brightness histogram. Then, if the white portion (W) is equal to or greater than the predetermined ratio (for example, 5% or 10%), as shown in FIG. 10, the control unit 100 increases/decreases the target brightness value (Yw) of short-time exposure control in accordance with the ratio (S684). The control unit 100 updates the target brightness value (Yw) to, for example, a value (Yw−Cw) obtained by subtracting a fixed value (Cw) from the current target brightness value (Yw). That is, the target brightness value (Yw) is updated in a direction to decrease short-time light exposure.

Then, the control unit 100 uses the first target brightness value (Yb) and the second target brightness value (Yw) corrected as described above to repeat the long-time exposure control (S62) and the short-time exposure control (S64) shown in FIG. 7. With such correction processing (S66 to S68) of the target brightness values and exposure control processing (S62 and S64) being repeated, for example, for each field period, exposure of a composite image converges to an exposure state in which neither underexposure nor overexposure occurs.

If, as a result, the black portion (B) and the white portion (W) are less than the predetermined ratio at S66, the control unit 100 determines that underexposure and overexposure have been eliminated by appropriate long-time exposure control and short-time exposure control being exercised and completes the auto exposure control in FIG. 7. Thus, by using the brightness histogram representing the brightness distribution of a composite image, the control unit 100 can properly determine whether there is any underexposure or overexposure in the composite image and properly perform auto exposure control of the composite image if necessary.

In the foregoing, auto exposure control (S60 in FIG. 5) in composite imaging mode has been described with reference to FIG. 7 to FIG. 11. By performing auto exposure control in composite imaging mode, as shown in FIG. 6B, a composite image 5 from which underexposure and overexposure have been eliminated can be output. Accordingly, for example, an underexposed face of a person in a dark portion 3 of a pickup image 1 in normal imaging mode in FIG. 6A is recognizably displayed in an area 6 of intermediate brightness of the composite image 5 in composite imaging mode in FIG. 6B. Also, an overexposed background in a bright portion 2 of the pickup image 1 in FIG. 6A is recognizably displayed in an area 7 brighter than the intermediate brightness of the composite image 5 in composite imaging mode in FIG. 6B.

However, because, as described above, both long-time exposure control and short-time exposure control are performed in auto exposure control in composite imaging mode described above, it takes longer before exposure converges when compared with the normal imaging mode. Moreover, as shown in FIG. 7, in addition to the exposure control, it is necessary for some imaging apparatuses to check the brightness distribution (brightness histogram) of a composite image to exercise exposure control while correcting the target brightness value so as to reach appropriate brightness distribution. In this case, it takes still longer before exposure converges. Thus, it takes a long time to exercise auto exposure control in composite imaging mode (for example, about 5 to 10 sec). Therefore, there is an issue that unnatural composite images are frequently output during auto exposure control if auto exposure control is exercised each time, as in the past, a temporary brightness change or fine brightness change of an object occurs. Consequently, if unnatural images accompanying AE processing in composite imaging mode are frequently output, the imaging apparatus will not be able to serve as a surveillance camera.

Thus, in the present embodiment, as show in FIG. 5, auto exposure control is stopped (S80) after the auto exposure control in composite imaging mode is temporarily completed (S70). Processing after the auto exposure control in composite imaging mode will be described below by returning to FIG. 5.

As shown in FIG. 5, when a transition from the normal imaging mode to the composite imaging mode occurs, the control unit 100 performs the auto exposure control at S60 described above (S60) and waits until the auto exposure control is temporarily completed (S70). Here, the time when the auto exposure control is temporarily completed is when the auto exposure control (both long-time exposure control and short-time exposure control) performed first after the transition to the composite imaging mode converges and, if an inspection using a brightness histogram is performed, when the inspection is completed.

Then, after the first auto exposure control in composite imaging mode is completed (S70), the control unit 100 stops the auto exposure control function (S80) and no auto exposure will be performed in subsequent composite imaging mode. By stopping the auto exposure control function, the f value of the diaphragm 12, the gain of the PGA, and shutter speeds of long-time exposure and short-time exposure are fixed. Accordingly, exposure control is prevented from following brightness changes of an object so that unnatural brightness changes in composite images accompanying dynamic range expansion that arise during imaging in composite imaging mode can be made not to take place.

However, if the auto exposure control function is stopped, when an object to be imaged changes (scene change) in composite imaging mode, scenes after the change will not be imagable by auto exposure. Thus, in the present embodiment, if after the auto exposure control in composite imaging mode is stopped, the control unit 100 continuously detects a predetermined brightness change in composite images for a predetermined time or longer based on the brightness integrated value from the detection unit 60, the control unit 100 determines that a scene change has taken place. Then, the control unit 100 switches the imaging mode of the imaging apparatus from the normal imaging mode to the composite imaging mode in accordance with detection of the scene change.

More specifically, the control unit 100 acquires a brightness value (Y1) of a composite image after the auto exposure control is completed based on the brightness integrated value received from the detection unit 60 and stores the brightness value (Y1) in a memory as a reference brightness value. The reference brightness value (Y1) stored here is assumed to be obtainable by any photometric method such as the center-weighted metering method, evaluative metering method, averaging metering method, and selective area metering method. The reference brightness value (Y1) serves as a reference when a brightness change is determined at S120 described later.

The photometric method of detecting a brightness change in composite images may be any method described above, but it is preferable to measure the whole composite image for a reason below. That is, if a wide dynamic range is applied in composite imaging mode, as shown in FIG. 6B, the composite image 5 has many areas 6, 7 around the intermediate brightness, leading to a low-contrast image and a small brightness difference in the composite image 5. Therefore, for example, by using a photometric method that sets detection frames in the whole composite image 5 and measures brightness in the detection frames, a brightness change of the composite image 5 can suitably be detected. If partial metering is selected on purpose, a center portion of the composite image 5 frequently viewed by users may be measured to detect a brightness change in the center portion.

Next, the control unit 100 initializes a timer (T) (resets the timer value being counted) (S100). The timer is used to detect a brightness change of an object after auto exposure control is stopped.

Further, the control unit 100 acquires a brightness value (Y2) of the composite image currently being imaged based on the brightness integrated value received from the detection unit 60 during imaging in composite imaging mode after the reference brightness value (Y1) being stored (S110). The current brightness value (Y2) is assumed to have been obtained by a photometric method similar to that of the reference brightness value (Y1).

Then, the control unit 100 determines whether a difference between the current brightness value (Y2) and the reference brightness value (Y1) is equal to or greater than a predetermined threshold (C2) (S120). If, as a result, the difference is less than the predetermined threshold (C2), the control unit 100 returns to S100 to initialize the timer (T) (S100). If, on the other hand, the difference is equal to or greater than the predetermined threshold (C2), the control unit 100 starts counting of the timer (T) (S130) and continues to S140.

Then, the control unit 100 determines whether a predetermined time has passed, that is, the time set to the timer (T) has passed after starting counting of the timer (T) at S130 (S140).

The predetermined time is a time serving as a reference to determine whether there is any fluctuation in brightness and is set, for example, at 5 to 10 sec. If, as a result of determination at S140, the predetermined time has not passed and the time set to the timer (T) has not passed, the control unit 100 returns to S110 and acquires the current brightness value (Y2) again (S110) and then, compares a difference between the brightness value (Y2) and the reference brightness value (Y1) with the threshold (C2).

If, on the other hand, the predetermined time has passed and the time set to the timer (T) has passed at S140, the state of an object during imaging in composite imaging mode can be determined to have changed (a scene has changed) because the above determination means that a predetermined brightness change has occurred in composite images.

Figure 6C:
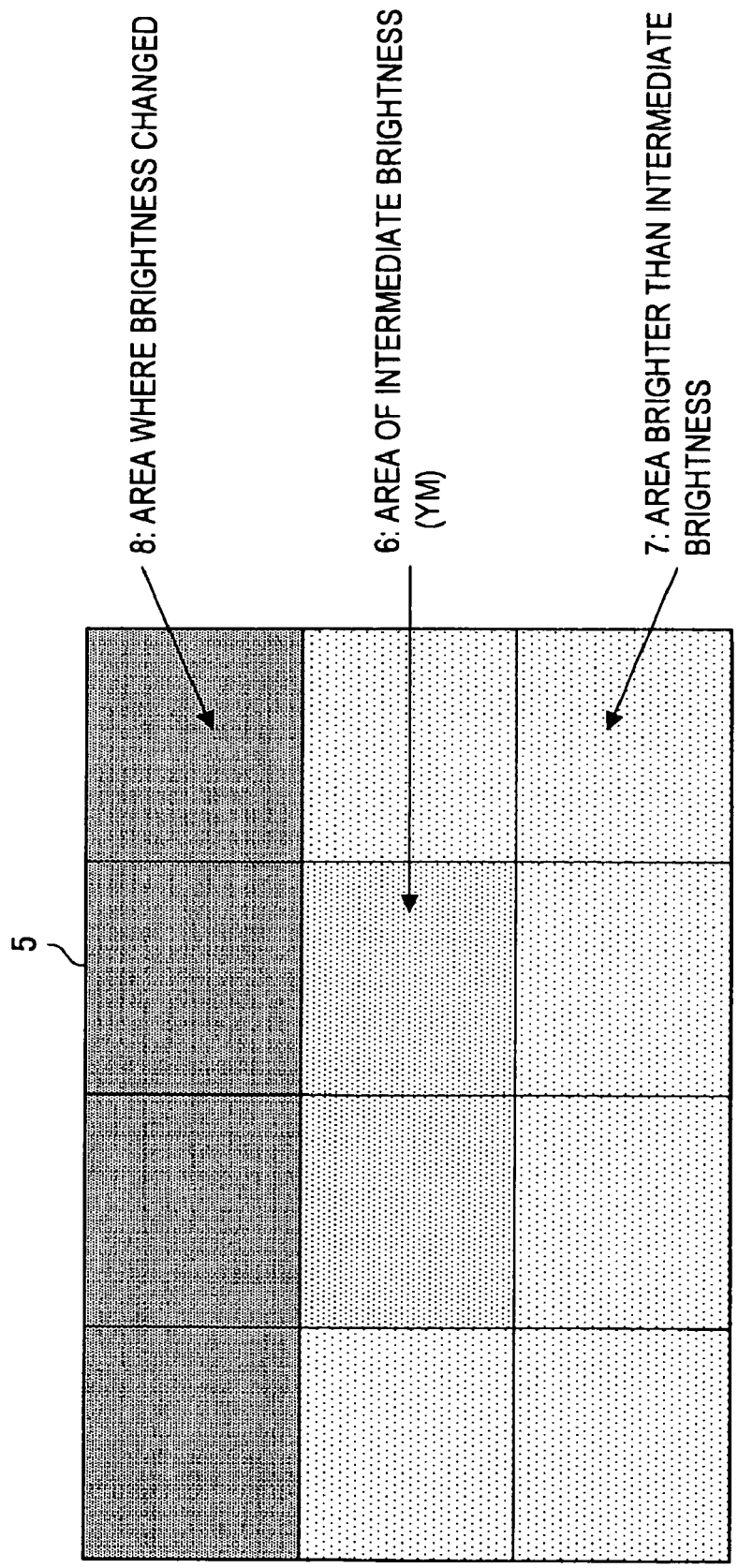
FIG. 6C is an explanatory view showing a composite image when a brightness change occurs from a state in FIG. 6B.

If, for example, a scene to be imaged changes from an object imaged during transition to the composite imaging mode to a new object much darker or brighter than the object, as shown in FIG. 6C, an area 8 whose brightness has changed arises in the composite image 5. The example in FIG. 6C shows a case in which a very dark object is contained in an upper part of the imaging range and the brightness is low in the area 8 where the brightness has changed in the upper part of the composite image 5. Therefore, the control unit 100 can detect a brightness change in the area 8 based on the brightness integrated value detected by the detection unit 60 and thus, can determine that a scene change has occurred.

When such a brightness change is detected, a scene change is determined if a predetermined brightness change or more continues for a predetermined time or longer. Therefore, a temporary brightness change such as a person passing through an imaging range is not determined to be a scene change and if such a brightness change continues for the predetermined time or longer, the scene is determined to have changed.

With processing S90 to S140 in composite imaging mode described above, a scene change of an object being imaged can be detected after the auto exposure control is stopped in composite imaging mode. Then, the control unit 100 switches the imaging mode of the imaging apparatus from the composite imaging mode to the normal imaging mode in accordance with detection of the scene change to restart an imaging operation in normal imaging mode and normal auto exposure control (S10 and S20). The reason for this is as follows.

If a scene change occurs during imaging in composite imaging mode, as described above, the composite image currently being imaged has a different brightness distribution from that when an object is imaged immediately after transition to the composite imaging mode. Thus, it is necessary to perform the auto exposure control again. Moreover, because a scene change has occurred, it is not appropriate to continue the composite imaging mode in a state of brightness control adjusted to a past object, and it is highly probable that it is more suitable to return to the normal imaging mode from the composite imaging mode.

Thus, if the control unit 100 detects a large brightness change that creates a brightness difference equal to or greater than the threshold (C2) with respect to the reference brightness value (Y1) continuously for a predetermined time or longer in composite imaging mode, the control unit 100 determines that a scene change has occurred. Then, the control unit 100 switches the imaging mode from the composite imaging mode to the normal imaging mode (S10) in accordance with detection of the brightness change to restart the auto exposure control (S20). Accordingly, a pickup image whose exposure is automatically controlled to fit to an object after the scene change can be obtained.

However, if there is still a brightness difference equal to or greater than the predetermined threshold (C1) between a bright portion and a dark portion in a pickup image (S40) even after the auto exposure control in normal imaging mode is performed, the control unit 100 switches the imaging mode from the normal imaging mode to the composite imaging mode again (S50). Then, the control unit 100 performs auto exposure control in composite imaging mode after being switched again for the composite image having the brightness difference (S60) and stops the auto exposure control (S80) after the auto exposure control is temporarily completed (S70).

Thus, by switching the composite imaging mode and normal imaging mode and turning ON/OFF the auto exposure control, natural images with appropriate exposure can be output with stability by restarting the auto exposure control even if a scene change occurs in composite imaging mode described above.

In the foregoing, an imaging apparatus and an imaging method according to the present embodiment have been described in detail. According to the present embodiment, when an imaging apparatus having a function to automatically switch two imaging modes of the composite imaging mode and normal imaging mode undergoes a transition from the normal imaging mode to the composite imaging mode, the auto exposure control function is stopped after exposure control for a composite image is temporarily completed. Further, if a predetermined brightness change of composite images is continuously detected for a predetermined time or longer in subsequent composite imaging mode, the auto exposure control is restarted after switching from the composite imaging mode to the normal imaging mode.

That is, according to the present embodiment, when auto exposure processing accompanying dynamic range expansion is completed after the imaging mode being automatically switched from the normal imaging mode to the composite imaging mode in a wide dynamic range camera, (1) the auto exposure is stopped and (2) if a predetermined brightness change continues in composite images for a predetermined time or longer, the auto exposure is restarted after switching from the composite imaging mode to the normal imaging mode. Accordingly, an occurrence of unnatural brightness change accompanying dynamic range expansion due to a temporary change of object in composite imaging mode can be prevented so that stable composite images can be provided as dynamic images.

According to the mode switching technique described in Japanese Patent Application Laid-Open No. 2002-84449 described above, if a difference between the shutter speed of long-time exposure and that of short-time exposure in composite imaging mode falls to a fixed value or below, the imaging mode is switched from the composite imaging mode to the normal imaging mode. In the present embodiment, however, auto exposure control is stopped in composite imaging mode and it is difficult to use the technique in Japanese Patent Application Laid-Open No. 2002-84449 because shutter speeds of long-time exposure and short-time exposure are fixed. Moreover, according to the mode switching technique described in Japanese Patent Application Laid-Open No. 2002-84449, only the shutter speed of long-time exposure and that of short-time exposure are compared and thus, the imaging mode may be switched to the normal imaging mode by sensitively reacting also to a temporary brightness change. In the switching technique according to the present embodiment, by contrast, the imaging mode is switched from the composite imaging mode to the normal imaging mode when a brightness change continues for a predetermined time or longer. Accordingly, mode switching caused by reacting to a temporary brightness change can be prevented and the imaging mode can be switched from the composite imaging mode to the normal imaging mode when a complete scene change occurs. Thus, in the present embodiment, only because the auto exposure control concerning fluctuations in brightness is stopped in composite imaging mode, the imaging mode can be switched from the composite imaging mode to the normal imaging mode in appropriate timing by appropriately grasping a brightness change of composite images.

It should be understood by those skilled in the art that various modifications, combinations, sub-combinations and alterations may occur depending on design requirements and other factors insofar as they are within the scope of the appended claims or the equivalents thereof.

The present invention can be applied to, for example, a camera system that picks up dynamic images, but can also be applied to a camera system that picks up still images. For example, the present invention can be applied to any imaging device such as a digital video camera to pick up dynamic images, a digital still camera to pick up still images, and a mobile phone with a camera function. Even when still images are picked up in set exposure mode, switching control of the imaging mode may be exercised, for example, during monitoring up to imaging timing (release).

When, for example, imaging in non-interlaced scan mode is performed, processing in the aforementioned field period may be considered as processing in a frame period. That is, the unit period to obtain an exposure image signal may be any unit period used by an imaging apparatus such as a field period, a frame period, a period of a plurality of fields, and a period of a plurality of frames. For example, an operation example in which detection processing, exposure correction processing, and exposure control processing are performed once in every period of a plurality of frames can be considered.

In the above embodiment, a brightness histogram is checked (S66) and correction processing of the target brightness value (S68) is performed, in addition to the long-time exposure control (S62) and short-time exposure control (S64), in the auto exposure control in composite imaging mode shown in FIG. 7. However, the present invention is not limited to such an example and, for example, the long-time exposure control (S62) and short-time exposure control (S64) may be performed without a brightness histogram being checked (S66) and correction processing of the target brightness value (S68) being performed. Moreover, the short-time exposure control (S64) is performed after the long-time exposure control (S62) being performed in the above embodiment, but the present invention is not limited to this and, for example, the long-time exposure control may be performed after the short-time exposure control being performed or the long-time exposure control and the short-time exposure control may be performed simultaneously.

In the above embodiment, an imaging apparatus equipped with the diaphragm 12, the electronic shutter of the image pickup device 20, and a PGA as exposure control means is described, but the present invention is not limited to such an example. For example, the present invention can be applied to an imaging apparatus without the diaphragm 12 or an imaging apparatus without PGA.

In the above embodiment, when a brightness change to be a reference for switching from the composite imaging mode to the normal imaging mode is detected, the predetermined time clocked by a timer is assumed to be a fixed value, but the present invention is not limited to such an example. For example, the predetermined time (timer value) may be made variable by providing a plurality of timer values in stages so that the user can manually set the timer value.

What is claimed is:

1. An imaging apparatus, comprising:
   an imaging processing unit capable of selectively performing an imaging operation in normal imaging mode to generate one normal exposure image signal in one unit period, and an imaging operation in composite imaging mode to generate a composite image signal by generating in one unit period a long-time exposure image signal for a relatively long exposure time and a short-time exposure image signal for a relatively short exposure time and combining the long-time exposure image signal and the short-time exposure image signal, the composite image signal having a wider dynamic range than a dynamic range of at least any one of the long-time exposure image signal and the short-time exposure image signal;
   a brightness detection unit that detects brightness values of images obtained from the normal exposure image signal or the composite image signal; and
   a control unit that performs auto exposure control to control light exposure of the normal exposure image signal or light exposure of the long-time exposure image signal and the short-time exposure image signal based on the brightness value detected by the brightness detection unit and also switches the imaging mode of the imaging processing unit between the normal imaging mode and the composite imaging mode based on the brightness value detected by the brightness detection unit, wherein
   the control unit stops the auto exposure control after the auto exposure control for the long-time exposure image signal and the short-time exposure image signal is temporarily completed in the composite imaging mode and
   if a predetermined brightness change of the images obtained from the composite image signal is continuously detected for a predetermined time or longer based on the brightness value detected by the brightness detection unit after the auto exposure control being stopped, the control unit switches the imaging mode of the imaging processing unit from the composite imaging mode to the normal imaging mode.

2. The imaging apparatus according to claim 1, wherein the auto exposure control in the composite imaging mode includes
   long-time exposure control to control the light exposure of the long-time exposure image signal by controlling at least any one of a diaphragm, a gain, or a shutter speed of the imaging processing unit to adjust the brightness value of a dark portion of the image obtained from the composite image signal to a first target brightness value and
   short-time exposure control to control the light exposure of the short-time exposure image signal by controlling the shutter speed of the imaging processing unit to adjust the brightness value of a bright portion of the image obtained from the composite image signal to a second target brightness value.

3. The imaging apparatus according to claim 2, wherein the auto exposure control in the composite imaging mode further includes
   processing to correct at least any one of the first target brightness value and the second target brightness value in accordance with a brightness distribution of the image obtained from the composite image signal.

4. The imaging apparatus according to claim 1, wherein the control unit switches the imaging mode of the imaging processing unit from the composite imaging mode to the normal imaging mode and also starts the auto exposure control for the normal exposure image signal in the normal imaging mode if the control unit continuously detects the predetermined brightness change for a predetermined time or longer after the auto exposure control being stopped.

5. The imaging apparatus according to claim 1, wherein the control unit stores the brightness value detected by the brightness detection unit after the auto exposure control being stopped as a reference brightness value in the composite imaging mode and, if a difference between the brightness value detected by the brightness detection unit after the storage and the reference brightness value is equal to or greater than a predetermined threshold continuously for a predetermined time or longer, the control unit switches the imaging mode of the imaging processing unit from the composite imaging mode to the normal imaging mode.

6. An imaging method by an imaging apparatus capable of selectively performing an imaging operation in normal imaging mode to generate one normal exposure image signal in one unit period, and an imaging operation in composite imaging mode to generate a composite image signal by generating in one unit period a long-time exposure image signal for a relatively long exposure time and a short-time exposure image signal for a relatively short exposure time and combining the long-time exposure image signal and the short-time exposure image signal, the composite image signal having a wider dynamic range than a dynamic range of at least any one of the long-time exposure image signal and the short-time exposure image signal, the method comprising the steps of:

switching the imaging mode of the imaging apparatus from the normal imaging mode to the composite imaging mode in accordance with a brightness difference in an image obtained from the normal exposure image signal;

performing auto exposure control to control light exposure of the long-time exposure image signal and the short-time exposure image signal in the composite imaging mode and after the auto exposure control being temporarily completed, stopping the auto exposure control; and detecting brightness values of images obtained from the composite image signal after the auto exposure control being stopped and if a predetermined brightness change in the images obtained from the composite image signal is continuously detected for a predetermined time or longer based on the detected brightness value, switching the imaging mode of the imaging apparatus from the composite imaging mode to the normal imaging mode.

7. A non-transitory computer readable medium having stored thereon a program causing a computer as an imaging apparatus capable of selectively performing an imaging operation in normal imaging mode to generate one normal exposure image signal in one unit period, and an imaging operation in composite imaging mode to generate a composite image signal by generating in one unit period a long-time exposure image signal for a relatively long exposure time and a short-time exposure image signal for a relatively short exposure time and combining the long-time exposure image signal and the short-time exposure image signal, the composite image signal having a wider dynamic range than a dynamic range of at least any one of the long-time exposure image signal and the short-time exposure image signal to execute the steps of:

switching the imaging mode of the imaging apparatus from the normal imaging mode to the composite imaging mode in accordance with a brightness difference in an image obtained from the normal exposure image signal;

performing auto exposure control to control light exposure of the long-time exposure image signal and the short-time exposure image signal in the composite imaging mode and after the auto exposure control being temporarily completed, stopping the auto exposure control; and detecting brightness values of images obtained from the composite image signal after the auto exposure control being stopped and if a predetermined brightness change in the images obtained from the composite image signal is continuously detected for a predetermined time or longer based on the detected brightness value, switching the imaging mode of the imaging apparatus from the composite imaging mode to the normal imaging mode.

* * * * *